United States Patent
Takeda et al.

(10) Patent No.: US 11,871,335 B2
(45) Date of Patent: Jan. 9, 2024

(54) PHYSICAL DOWNLINK CONTROL CHANNEL TRANSMISSIONS FOR MULTICAST/BROADCAST SYSTEM SERVICES

(71) Applicant: QUALCOMM Incorporated, San Diego, CA (US)

(72) Inventors: Kazuki Takeda, Minato-ku (JP); Le Liu, San Jose, CA (US); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/145,235

(22) Filed: Dec. 22, 2022

(65) Prior Publication Data

US 2023/0119916 A1    Apr. 20, 2023

Related U.S. Application Data

(63) Continuation of application No. 17/804,797, filed on May 31, 2022, now Pat. No. 11,540,208.

(60) Provisional application No. 63/262,349, filed on Oct. 10, 2021, provisional application No. 63/260,560, filed on Aug. 25, 2021.

(51) Int. Cl.
    H04W 48/12    (2009.01)
    H04L 5/00     (2006.01)

(52) U.S. Cl.
    CPC ........... *H04W 48/12* (2013.01); *H04L 5/0051* (2013.01)

(58) Field of Classification Search
    None
    See application file for complete search history.

(56) References Cited

U.S. PATENT DOCUMENTS

| 11,540,208 B1 | 12/2022 | Takeda et al. |
| 2022/0232403 A1* | 7/2022 | Lee ................... H04W 72/0446 |
| 2022/0264613 A1* | 8/2022 | Xu ......................... H04L 5/0051 |

OTHER PUBLICATIONS

Huawei et al., "Resource Configuration and Group Scheduling for RRC_CONNECTED UEs", 3GPP TSG RAN WGI #106-e, R1-2106438, 3rd Generation Partnership Project, Mobile Competence Centre, 650, Route DesLucioles ; F-06921 Sophia-Antipolis Cedex, France, vol. RAN WG1, No. E-meeting, Aug. 16, 2021-Aug. 27, 2021 Aug. 7, 2021, XP052037766, 7 Pages.
International Search Report and Written Opinion—PCT/US2022/075420—ISA/EPO—dated Nov. 18, 2022.

(Continued)

*Primary Examiner* — Hong S Cho
(74) *Attorney, Agent, or Firm* — Harrity & Harrity, LLP

(57) ABSTRACT

Various aspects of the present disclosure generally relate to wireless communication. In some aspects, a user equipment (UE) may monitor a search space associated with a physical downlink control channel (PDCCH) corresponding to a multicast/broadcast (MBS) physical downlink shared channel (PDSCH) for at least one MBS PDCCH communication having a payload that is scrambled according to a PDCCH payload scrambling sequence based on a value of a radio network temporary identifier (RNTI), wherein the value of the RNTI is equal to a group-RNTI (G-RNTI) or zero. The UE may receive the at least one MBS PDCCH communication. Numerous other aspects are described.

30 Claims, 12 Drawing Sheets

(56) References Cited

OTHER PUBLICATIONS

Samsung: "On Basic Functions for Broadcast/Multicast for RRC_IDLE/RRC_INACTIVE UEs", 3GPP TSG RAN WG1 #104-e, R1-2101236, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971449, pp. 1-3, p. 1.

Samsung: "On Mechanisms to Support Group Scheduling for RRC_CONNECTED UEs", 3GPP TSG RAN WG1 #104-e, R1-2101234, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971447, pp. 1-6.

* cited by examiner

PHYSICAL DOWNLINK CONTROL CHANNEL TRANSMISSIONS FOR MULTICAST/BROADCAST SYSTEM SERVICES

CROSS-REFERENCE TO RELATED APPLICATION

This patent application is a continuation of U.S. patent application Ser. No. 17/804,797, filed May 31, 2022 (now U.S. Pat. No. 11,540,208), entitled "PHYSICAL DOWNLINK CONTROL CHANNEL TRANSMISSIONS FOR MULTICAST/BROADCAST SYSTEM SERVICES," which claims priority to U.S. Provisional Patent Application No. 63/260,560, filed on Aug. 25, 2021, entitled "PHYSICAL DOWNLINK CONTROL CHANNEL TRANSMISSIONS FOR MULTICAST/BROADCAST SYSTEM SERVICES" and also claims priority to U.S. Provisional Patent Application No. 63/262,349, filed on Oct. 10, 2021, entitled "PHYSICAL DOWNLINK CONTROL CHANNEL TRANSMISSIONS FOR MULTICAST/BROADCAST SYSTEM SERVICES." All applications are assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for physical downlink control channel transmissions for multicast/broadcast system services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include monitoring a search space associated with a physical downlink control channel (PDCCH) corresponding to a multicast/broadcast system (MBS) physical downlink shared channel (PDSCH) for at least one MBS PDCCH communication having a payload that is scrambled according to a PDCCH payload scrambling sequence based on a value of a radio network temporary identifier (RNTI), wherein the value of the RNTI is equal to zero. The method may include receiving the at least one MBS PDCCH communication.

Some aspects described herein relate to a method of wireless communication performed by a UE. The method may include monitoring a search space associated with a PDCCH corresponding to an MBS PDSCH for at least one MBS PDCCH communication having a control channel element (CCE) index corresponding to a hash function that is based on a value of an RNTI, wherein the value of the RNTI is equal to zero. The method may include receiving the at least one MBS PDCCH communication.

Some aspects described herein relate to a method of wireless communication performed by a UE. The method may include receiving an MBS configuration that configures a plurality of G-RNTIs for a cell. The method may include monitoring, based on the MBS configuration, at least one search space associated with a PDCCHPDCCH corresponding to an MBS PDSCH of the cell for at least one MBS PDCCH communication that schedules at least one MBS PDSCH communication of a plurality of MBS PDSCH communications.

Some aspects described herein relate to a method of wireless communication performed by a network node. The method may include transmitting an MBS configuration that indicates a PDCCH payload scrambling sequence based on a value of an RNTI for a search space associated with a PDCCHPDCCH corresponding to an MBS PDSCH, wherein the value of the RNTI is equal to zero. The method may include transmitting at least one MBS PDCCH communication based at least in part on the configuration.

Some aspects described herein relate to a method of wireless communication performed by a base station. The method may include transmitting an MBS configuration that indicates a PDCCH hash function based on a value of an RNTI for a search space associated with a PDCCH corresponding to an MBS PDSCH, wherein the value of the RNTI is equal to zero. The method may include transmitting at least one MBS PDCCH communication based at least in part on the configuration.

Some aspects described herein relate to a method of wireless communication performed by a network node. The method may include transmitting an MBS configuration that configures a plurality of G-RNTIs for a cell. The method may include transmitting, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications.

Some aspects described herein relate to a UE for wireless communication. The user equipment may include a memory and one or more processors coupled to the memory. The one or more processors may be configured to monitor a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to zero. The one or more processors may be configured to receive the at least one MBS PDCCH communication.

Some aspects described herein relate to a UE for wireless communication. The user equipment may include a memory and one or more processors coupled to the memory. The one or more processors may be configured to monitor a search space associated with a PDCCH corresponding to an MBS PDSCH for at least one MBS PDCCH communication having a CCE index corresponding to a hash function that is based on a value of an RNTI, wherein the value of the RNTI is equal to zero. The one or more processors may be configured to receive the at least one MBS PDCCH communication.

Some aspects described herein relate to a UE for wireless communication. The user equipment may include a memory and one or more processors coupled to the memory. The one or more processors may be configured to receive an MBS configuration that configures a plurality of G-RNTIs for a cell. The one or more processors may be configured to monitor, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications.

Some aspects described herein relate to a network node for wireless communication. The network node may include a memory and one or more processors coupled to the memory. The one or more processors may be configured to transmit an MBS configuration that indicates a PDCCH payload scrambling sequence based on a value of an RNTI for a search space associated with a PDCCH corresponding to an MBS PDSCH, wherein the value of the RNTI is equal to a G-RNTI or zero. The one or more processors may be configured to transmit at least one MBS PDCCH communication based at least in part on the configuration.

Some aspects described herein relate to a network node for wireless communication. The network node may include a memory and one or more processors coupled to the memory. The one or more processors may be configured to transmit an MBS configuration that indicates a PDCCH hash function based on a value of an RNTI for a search space associated with a PDCCH corresponding to an MBS PDSCH, wherein the value of the RNTI is equal to zero. The one or more processors may be configured to transmit at least one MBS PDCCH communication based at least in part on the configuration.

Some aspects described herein relate to a network node for wireless communication. The network node may include a memory and one or more processors coupled to the memory. The one or more processors may be configured to transmit an MBS configuration that configures a plurality of G-RNTIs for a cell. The one or more processors may be configured to transmit, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications.

Some aspects described herein relate to a non-transitory computer-readable medium that stores a set of instructions for wireless communication by a UE. The set of instructions, when executed by one or more processors of the UE, may cause the UE to monitor a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to zero. The set of instructions, when executed by one or more processors of the UE, may cause the UE to receive the at least one MBS PDCCH communication.

Some aspects described herein relate to a non-transitory computer-readable medium that stores a set of instructions for wireless communication by a UE. The set of instructions, when executed by one or more processors of the UE, may cause the UE to monitor a search space associated with a PDCCH corresponding to an MBS PDSCH for at least one MBS PDCCH communication having a CCE index corresponding to a hash function that is based on a value of an RNTI, wherein the value of the RNTI is equal to zero. The set of instructions, when executed by one or more processors of the UE, may cause the UE to receive the at least one MBS PDCCH communication.

Some aspects described herein relate to a non-transitory computer-readable medium that stores a set of instructions for wireless communication by an UE. The set of instructions, when executed by one or more processors of the UE, may cause the UE to receive an MBS configuration that configures a plurality of G-RNTIs for a cell. The set of instructions, when executed by one or more processors of the UE, may cause the UE to monitor, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications.

Some aspects described herein relate to a non-transitory computer-readable medium that stores a set of instructions for wireless communication by a network node. The set of instructions, when executed by one or more processors of the network node, may cause the network node to transmit an MBS configuration that indicates a PDCCH payload scrambling sequence based on a value of an RNTI for a search space associated with a PDCCH corresponding to an MBS PDSCH, wherein the value of the RNTI is equal to zero. The set of instructions, when executed by one or more processors of the network node, may cause the network node to transmit at least one MBS PDCCH communication based at least in part on the configuration.

Some aspects described herein relate to a non-transitory computer-readable medium that stores a set of instructions for wireless communication by a network node. The set of instructions, when executed by one or more processors of the network node, may cause the network node to transmit an MBS configuration that indicates a PDCCH hash function based on a value of an RNTI for a search space associated with a PDCCH corresponding to an MBS PDSCH, wherein the value of the RNTI is equal to zero. The set of instructions, when executed by one or more processors of the network node, may cause the network node to transmit at least one MBS PDCCH communication based at least in part on the configuration.

Some aspects described herein relate to a non-transitory computer-readable medium that stores a set of instructions for wireless communication by a network node. The set of instructions, when executed by one or more processors of the network node, may cause the network node to transmit an MBS configuration that configures a plurality of G-RNTIs for a cell. The set of instructions, when executed by one or more processors of the network node, may cause the network node to transmit, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications.

Some aspects described herein relate to an apparatus for wireless communication. The apparatus may include means for monitoring a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to zero. The apparatus may include means for receiving the at least one MBS PDCCH communication.

Some aspects described herein relate to an apparatus for wireless communication. The apparatus may include means for monitoring a search space associated with a PDCCH corresponding to an MBS PDSCH for at least one MBS PDCCH communication having a CCE index corresponding to a hash function that is based on a value of an RNTI, wherein the value of the RNTI is equal to zero. The apparatus may include means for receiving the at least one MBS PDCCH communication.

Some aspects described herein relate to an apparatus for wireless communication. The apparatus may include means for receiving an MBS configuration that configures a plurality of G-RNTIs for a cell. The apparatus may include means for monitoring, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications.

Some aspects described herein relate to an apparatus for wireless communication. The apparatus may include means for transmitting an MBS configuration that indicates a PDCCH payload scrambling sequence based on a value of an RNTI for a search space associated with a PDCCH corresponding to an MBS PDSCH, wherein the value of the RNTI is equal to zero. The apparatus may include means for transmitting at least one MBS PDCCH communication based at least in part on the configuration.

Some aspects described herein relate to an apparatus for wireless communication. The apparatus may include means for transmitting an MBS configuration that indicates a PDCCH hash function based on a value of am RNTI for a search space associated with a PDCCH corresponding to an MBS PDSCH, wherein the value of the RNTI is equal to zero. The apparatus may include means for transmitting at least one MBS PDCCH communication based at least in part on the configuration.

Some aspects described herein relate to an apparatus for wireless communication. The apparatus may include means for transmitting an MBS configuration that configures a plurality of G-RNTIs for a cell. The apparatus may include means for transmitting, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
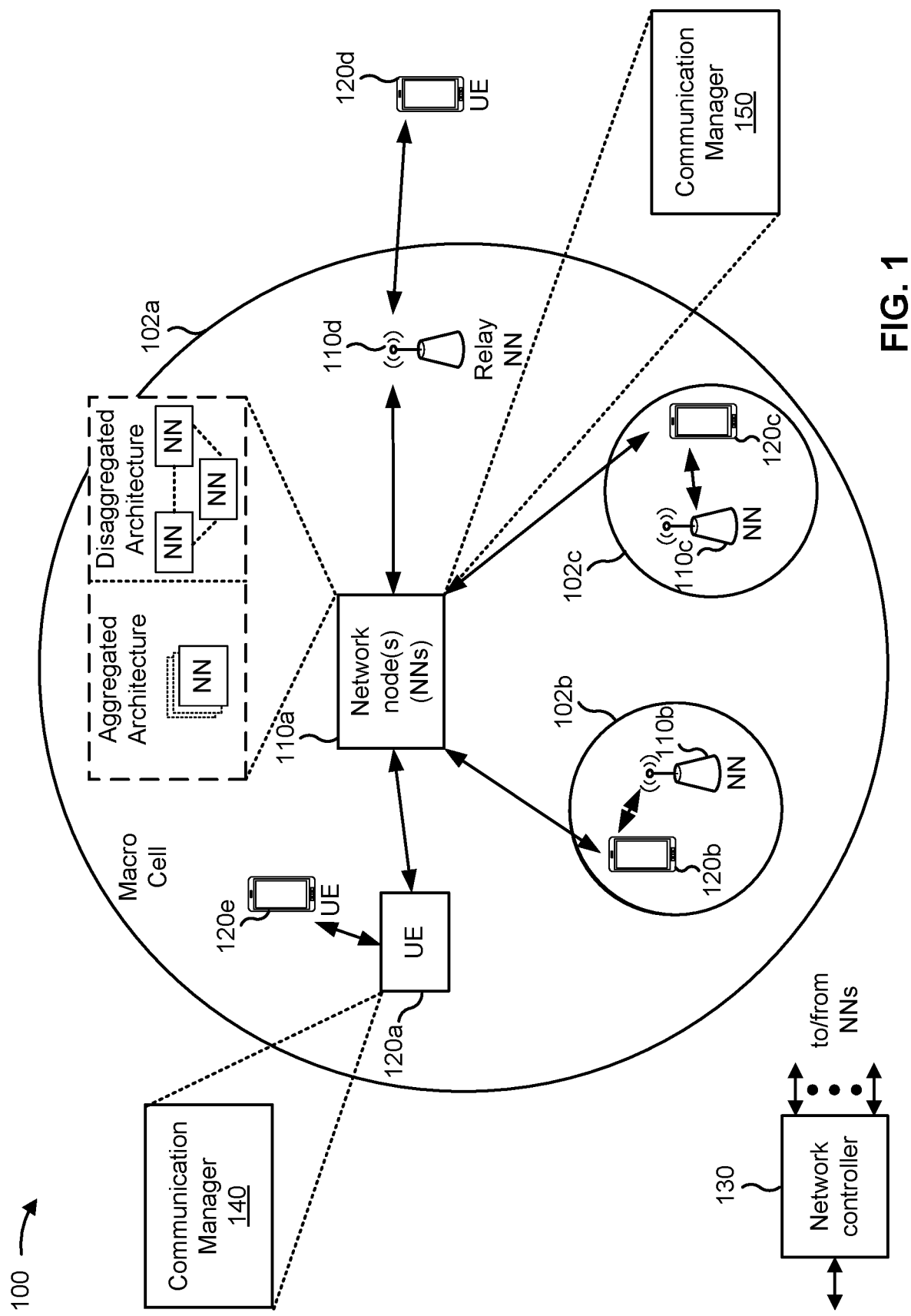
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

In some aspects, the term "base station" or "network entity" may refer to an aggregated base station, a disaggregated base station, an integrated access and backhaul (IAB) node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network entity 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may monitor a search space associated with a physical downlink control channel (PDCCH) corresponding to a multicast/broadcast system (MBS) physical downlink shared channel (PDSCH) for at least one MBS PDCCH communication having a payload that is scrambled according to a PDCCH payload scrambling sequence based on a value of a radio network temporary identifier (RNTI), wherein the value of the RNTI is equal to a group-RNTI (G-RNTI) or zero; and receive the at least one MBS PDCCH communication. Additionally, or alternatively, the communication manager 140 may perform one or more other operations described herein.

In some aspects, the UE 120 may include a communication manager 140. As described in more detail elsewhere herein, the communication manager 140 may monitor a search space associated with a PDCCH corresponding to an MBS PDSCH for at least one MBS PDCCH communication having a control channel element (CCE) index corresponding to a hash function that is based on a value of an RNTI, wherein the value of the RNTI is equal to a G-RNTI or zero; and receive the at least one MBS PDCCH communication. Additionally, or alternatively, the communication manager 140 may perform one or more other operations described herein.

In some aspects, the UE 120 may include a communication manager 140. As described in more detail elsewhere herein, the communication manager 140 may receive an MBS configuration that configures a plurality of G-RNTIs for a cell; and monitor, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications. Additionally, or alternatively, the communication manager 140 may perform one or more other operations described herein.

In some aspects, the network node 110 may include a communication manager 150. As described in more detail elsewhere herein, the communication manager 150 may transmit an MBS configuration that indicates a PDCCH payload scrambling sequence based on a value of an RNTI for a search space associated with a PDCCH corresponding to an MBS PDSCH, wherein the value of the RNTI is equal to a G-RNTI or zero; and transmit at least one MBS PDCCH communication based at least in part on the configuration. Additionally, or alternatively, the communication manager 150 may perform one or more other operations described herein.

In some aspects, the network node 110 may include a communication manager 150. As described in more detail elsewhere herein, the communication manager 150 may transmit an MBS configuration that indicates a PDCCH hash function based on a value of an RNTI for a search space associated with a PDCCH corresponding to an MBS PDSCH, wherein the value of the RNTI is equal to a G-RNTI or zero; and transmit at least one MBS PDCCH communication based at least in part on the configuration. Additionally, or alternatively, the communication manager 150 may perform one or more other operations described herein.

In some aspects, the network node 110 may include a communication manager 150. As described in more detail elsewhere herein, the communication manager 150 may transmit an MBS configuration that configures a plurality of G-RNTIs for a cell; and transmit, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications. Additionally, or alternatively, the communication manager 150 may perform one or more other operations described herein.

As indicated above, FIG. 1 is provided as an example. Other examples may differ from what is described with regard to FIG. 1.

Figure 2:
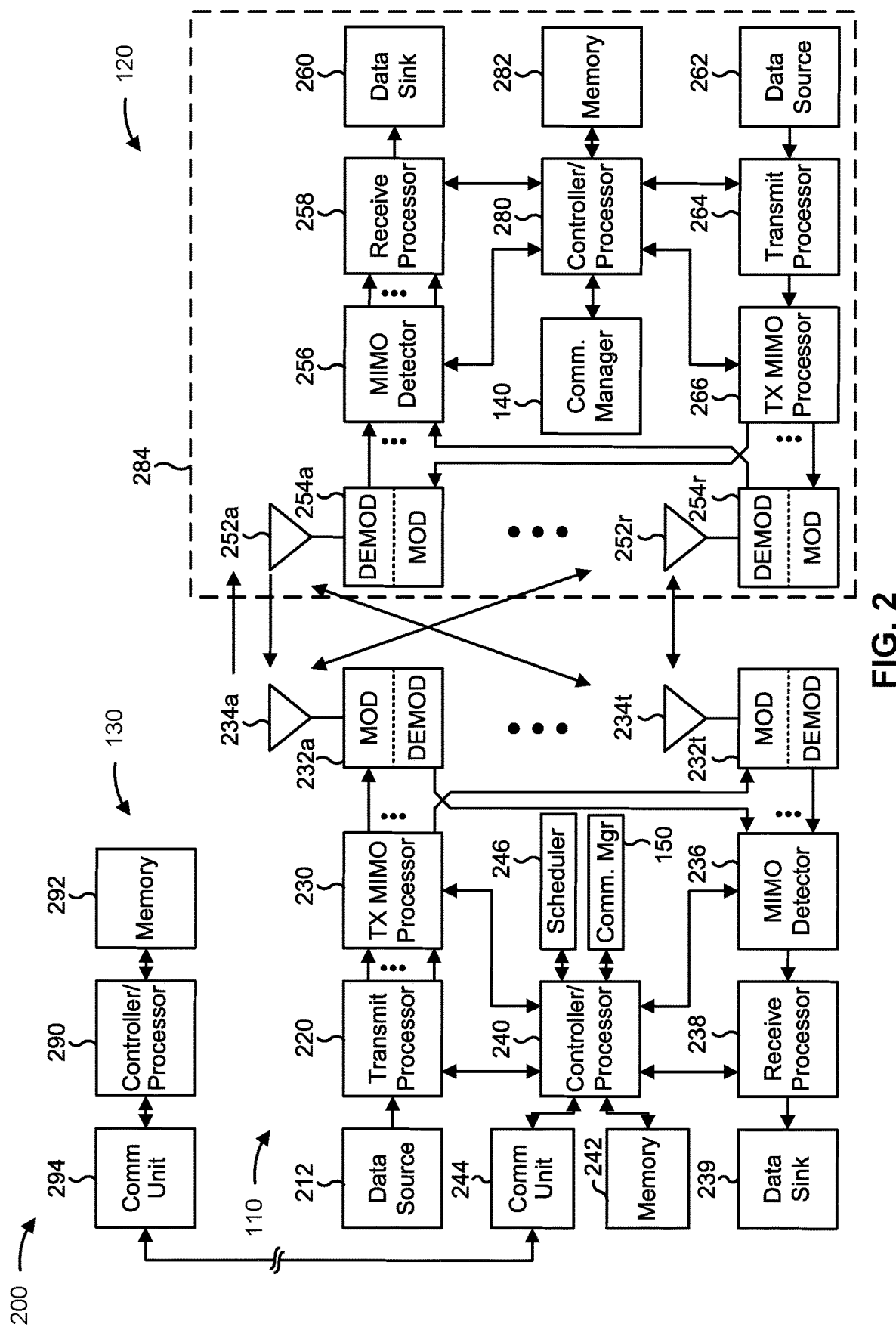
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor 240 of the base station 110, the controller/processor 280 of the UE 120, and/or any other component(s) of FIG. 2 may perform one or more techniques associated with PDCCH transmissions for MBS services, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for monitoring a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to a G-RNTI or zero; and/or means for receiving the at least one MBS PDCCH communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for monitoring a search space associated with a PDCCH corresponding to an MBS PDSCH for at least one MBS PDCCH communication having a CCE index corresponding to a hash function that is based on a value of an RNTI, wherein the value of the RNTI is equal to a G-RNTI or zero; and/or means for receiving the at least one MBS PDCCH communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving an MBS configuration that configures a plurality of G-RNTIs for a cell; and/or means for monitoring, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an MB S configuration that indicates a PDCCH payload scrambling sequence based on a value of an RNTI for a search space associated with a PDCCH corresponding to an MBS PDSCH, wherein the value of the RNTI is equal to a G-RNTI or zero; and/or means for transmitting at least one MBS PDCCH communication based at least in part on the configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node includes means for transmitting an MB S configuration that indicates a PDCCH hash function based on a value of an RNTI for a search space associated with a PDCCH corresponding to an MBS PDSCH, wherein the value of the RNTI is equal to a G-RNTI or zero; and/or means for transmitting at least one MBS PDCCH communication based at least in part on the configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network node includes means for transmitting an MB S configuration that configures a plurality of G-RNTIs for a cell; and/or means for transmitting, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
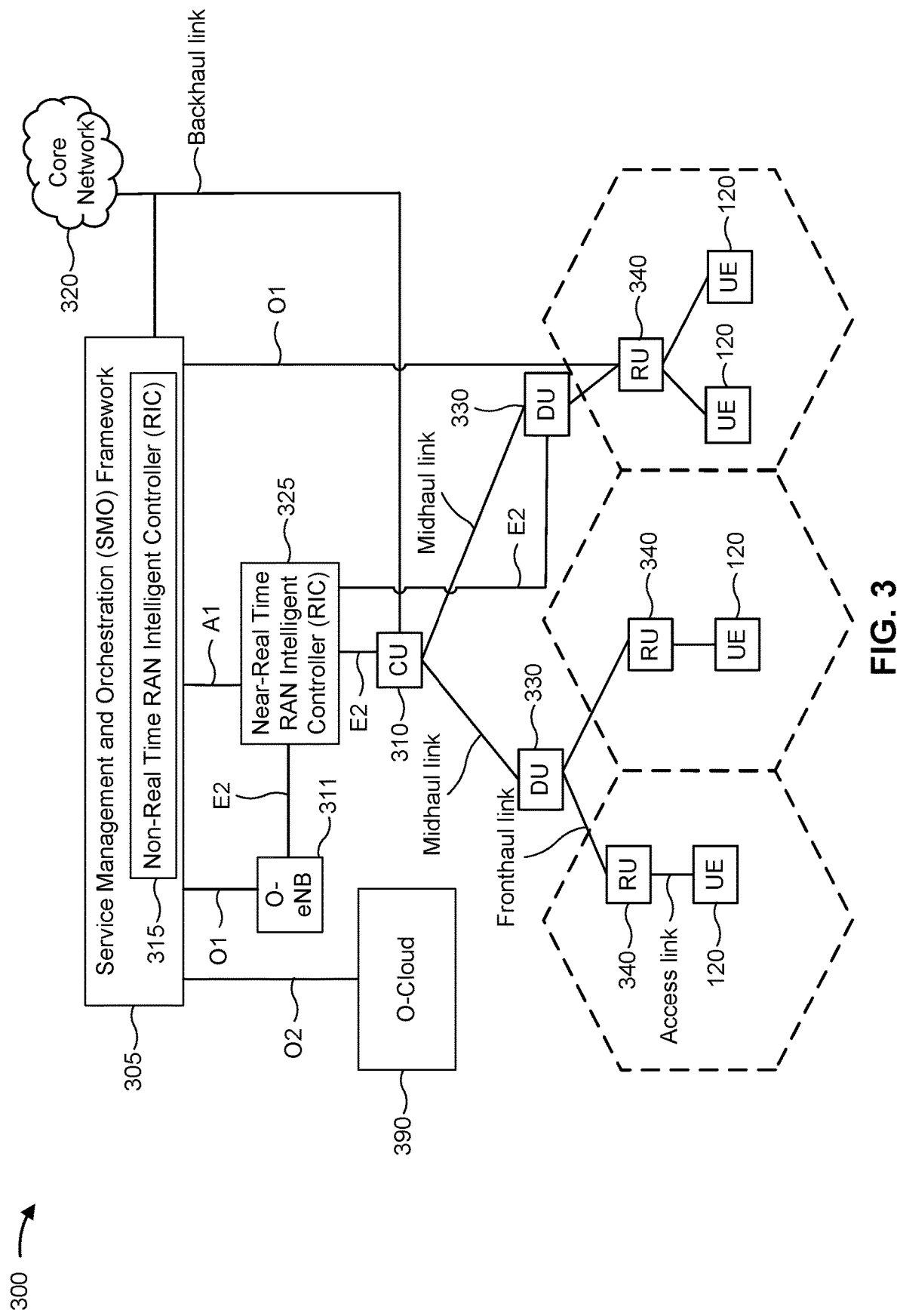
FIG. 3 is a diagram illustrating an example of a disaggregated based station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT MC 325 and may be received at the SMO Framework 305 or the Non-RT RIC 315 from non-network data sources or from network functions. In some examples, the Non-RT MC 315 or the Near-RT MC 325 may be configured to tune RAN behavior or performance. For example, the Non-RT MC 315 may monitor long-term trends and patterns for performance and employ AI/ML models to perform corrective actions through the SMO Framework 305 (such as reconfiguration via an O1 interface) or via creation of RAN management policies (such as A1 interface policies).

A network node may use PDCCH transmissions to schedule PDSCH transmissions for a UE. However, a number of UEs may be interacting with a cell and/or connected to the cell. To facilitate directing a PDCCH transmission to a specific UE of multiple UEs in a cell, a network node can scramble a PDCCH payload prior to modulation in accordance with a scrambling sequence that is recognizable by the UE. In this way, UEs to which the transmission is not directed can avoid decoding a scheduling transmission, and the network node can schedule each UE independently, even though more than one UE may detect the scheduling transmission.

In some cases, a UE may be configured to monitor for PDCCH transmissions having payloads scrambled according to a scrambling sequence that is based on a value of an RNTI, where the value of the RNTI is equal to a cell-RNTI (C-RNTI) or zero. In some cases, for example, the value of the RNTI is equal to the C-RNTI if the communication is intended for a UE-specific search space (USS) and if a particular parameter is configured, and equal to zero otherwise.

For example, a UE may be configured to monitor for PDCCH transmissions that have a payload containing a block of scrambled bits $\tilde{b}(0), \ldots \tilde{b}(M_{bit}-1)$ generated by a scrambling operation performed on a block of bits $b(0), \ldots b(M_{bit}-1)$ prior to modulation according to $\tilde{b}(i)=(b(i)+c(i)) \mod 2$, where the scrambling sequence $c(i)$ may be specified in a wireless communication standard. The scrambling sequence generator can be initialized with a scrambling sequence initialization function $$c_{init}=(n_{RNTI} \cdot 2^{16}+n_{ID}) \mod 2^{31}$$

where, for a UE-specific search space, $n_{ID} \in \{0, 1, \ldots, 65535\}$ equals the higher-layer parameter pdcch-DMRS-ScramblingID if configured, and $n_{ID}=n_{ID}^{cell}$ otherwise, and where $n_{RNTI}$ is given by the C-RNTI for a PDCCH in a UE-specific search space if the higher-layer parameter pdcch-DMRS-ScramblingID is configured, and $n_{RNTI}=0$ otherwise.

The PDCCH payload scrambling above is useful for directing PDCCH transmissions to a UE among multiple UEs. However, in an MBS system, an attempt by the network node to use this scrambling scheme will not be successful in directing a PDCCH transmission to multiple UEs (e.g., for multicast and/or broadcast), as the C-RNTIs are UE-specific. As a result, the scrambling scheme may inhibit MBS communications and thereby have a negative impact on network performance.

In some cases, for common search spaces (CSSs), multiple UEs can monitor a PDCCH candidate on a same set of CCEs. For example, for a search space set s associated with a core resource set (CORESET) p, the CCE indexes for aggregation level L corresponding to a PDCCH candidate $m_{s,n_{CI}}$ of the search space set in slot $n_{s,f}^\mu$ for an active downlink bandwidth part (BWP) of a serving cell corresponding to carrier indicator field value $n_u$ can be given by $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where for any CSS, $Y_{p,n_{s,f}^\mu}=0$; for any USS, $Y_{p,n_{s,f}^\mu}=(A_p \cdot Y_{p,n_{s,f}^\mu-1}) \mod D$, $Y_{p,-1}=n_{RNTI} \neq 0$, $A_p=39827$ for pmod3=0, $A_p=39829$ for pmod3=1, $A_p=39839$ for pmod3=2, and D=65537; i=0, ..., L-1; $N_{CCE,p}$ is the number of CCEs, numbered from 0 to $N_{CCE,p}-1$, in CORESET p and, if any, per resource block (RB) set; $n_{CI}$ is the carrier indicator field value if the UE is configured with a carrier indicator field by a cross carrier scheduling configuration parameter (e.g., CrossCarrierSchedulingConfig) for the serving cell on which PDCCH is monitored; otherwise, including for any CSS, $n_{CI}=0$; $m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space sets for a serving cell corresponding to $n_{CI}$; for any CSS, $M_{s,max}^{(L)}=M_{s,0}^{(L)}$; for a USS, $M_{s,max}^{(L)}$ is the maximum of $M_{s,n_{CI}}^{(L)}$ over all configured $n_{CI}$ values for a CCE aggregation level L of search space set s; and the RNTI value used for $n_{RNTI}$ is the C-RNTI.

In this way, a single downlink control information (DCI) transmission can be delivered to all the UEs. For UE-specific search spaces, different UEs have different C-RNTI values and a PDCCH candidate for different UEs can be mapped on different set of CCEs. However, in general, common DCI transmission on a UE-specific search space is not possible. Thus, in an MBS system, an attempt by the network node to use a hash function based on a C-RNTI will not be successful in directing a PDCCH transmission to multiple UEs (e.g., for multicast and/or broadcast), as the C-RNTIs are UE-specific. As a result, the hash function may inhibit MBS communications and thereby have a negative impact on network performance.

In some cases, error detection can be provided on DCI transmissions using a cyclic redundancy check (CRC). To facilitate a CRC, an entire payload may be used to calculate CRC parity bits according to a procedure that can be specified by a wireless standard. The CRC parity bits can be scrambled with a corresponding RNTI such that a UE can interpret the CRC parity bits for detecting errors. The RNTI on which the CRC scrambling can be based can be any number of different RNTIs, including a C-RNTI, a modulation coding scheme cell RNTI (MCS-C-RNTI), a configured scheduling RNTI (CS-RNTI), a system information RNTI (SI-RNTI), a paging RNTI (P-RNTI), a random access RNTI (RA-RNTI), and/or a slot format indication RNTI (SFI-RNTI), among other examples. Although a G-RNTI may be used to scramble CRC parity bits, a single G-RNTI may not enable multiple PDSCH transmissions for multiple MBS services. As a result, the CRC scrambling using a single RNTI may inhibit MBS communications and thereby have a negative impact on network performance.

In some cases, a search space associated with a PDCCH corresponding to an MBS PDSCH may include, for example, a CSS of an MBS-dedicated type (which may be referred to, for example, as a Type-x CSS). The search space may be used for group-common PDCCH transmissions for multicast in an RRC connected state. The monitoring priority of search space associated with a PDCCH corresponding to an MBS PDSCH can be determined based on the search space set indexes of the Type-x CSS set and USS sets, regardless of which DCI format of group-common PDCCH is configured in the Type-x CSS. The group-common PDCCH used in an MBS can be configured to support at least two DCI formats. For example, DCI format 1_0 can be used as the baseline for the first DCI format with CRC scrambled with G-RNTI. The DCI format 1_1 or 1_2 can be used as the baseline for the second DCI format with CRC scrambled with G-RNTI. As described above, however, USS-based payload scrambling schemes, hash functions, and/or CRC scrambling schemes may be unable to accommodate the MBS communications.

Some aspects may provide PDCCH payload scrambling for PDCCH transmissions that schedule MBS PDSCH communications. Some aspects may provide hash functions for PDCCH transmissions that schedule MBS PDSCH communications. Some aspects may provide CRC scrambling for PDCCH transmissions that schedule MBS PDSCH communications. The scrambling and hashing techniques described herein may be based on RNTIs that may have values equal to zero or equal to a G-RNTI (or G-RNTIs). In this way, PDCCH payload scrambling, hash functions, and CRC scrambling may be adapted to be used for PDCCH transmissions that schedule MBS PDSCH communications so that multiple UEs may receive multicast and/or broadcast transmissions. As a result, some aspects may facilitate multicast and/or broadcast transmissions, thereby having a positive impact on network performance.

Figure 4:
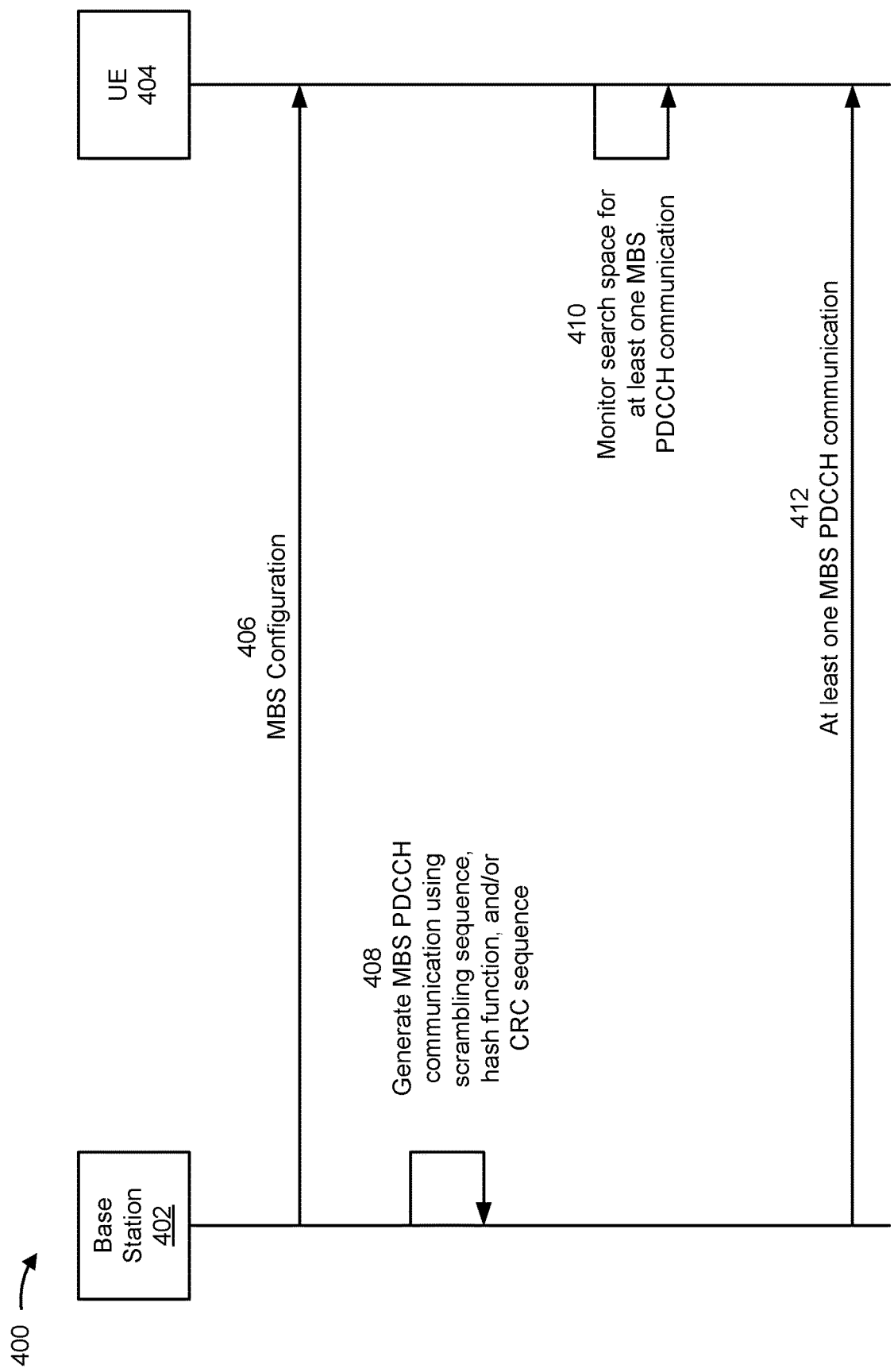
FIG. 4 is a diagram illustrating an example associated with physical downlink control channel (PDCCH) transmissions for multicast/broadcast system (MBS) services, in accordance with the present disclosure.

FIG. 4 is a diagram illustrating an example 400 associated with PDCCH transmissions for MBS services, in accordance with the present disclosure. As shown in FIG. 4, a network node 402 and a UE 404 may communicate with one another. The network node 402 may communicate with a number of UEs 404 in an MBS implementation, though only one of such UEs 404 is shown in FIG. 4.

As shown by reference number 406, the network node 402 may transmit, and the UE 404 may receive, an MBS configuration. In some aspects, for example, the UE 404 may be provided with a common frequency resource (CFR) configuration. The CFR may include information indicating where, in a frequency domain, MBS data may be scheduled. The CFR configuration may include other parameters used to facilitate MBS communications. For example, RRC configurations for the CORESET and the associated search space may be provided as part of the CFR configuration.

In some aspects, the MBS configuration (and/or one or more aspects thereof) may be, include, be included in, or be similar to the CFR configuration. In some aspects, the network node 402 may transmit, and the UE 404 may receive, a configuration of a PDCCH DMRS scrambling identifier for a control resource set associated with the search space. For example, the configuration may configure the pdcch-DMRS-ScramblingID parameter. In some aspects, the network node 402 may transmit, and the UE 404 may receive, a dedicated configuration indication that configures the search space associated with a PDCCH corresponding to an MBS PDSCH. The dedicated configuration indication may be transmitted using a dedicated RRC message and/or a dedicated RRC parameter. In some aspects, the network node 402 may transmit, and the UE 404 may receive, an MBS configuration that configures a plurality of G-RNTIs for a cell. In some aspects, at least one G-RNTI of the plurality of G-RNTIs may include a value of an RNTI associated with at least one of a PDCCH payload scrambling sequence, a hash function corresponding to a CCE index, or a CRC scrambling sequence. In some aspects, the G-RNTIs may be configured using a G-RNTI list. In some aspects, the configuration may indicate a mapping between the G-RNTIs and respective multicast services. The multicast services may include specified multicast service identifiers (IDs). In some aspects, the network node 402 may transmit, and the UE 404 may receive, a configuration that indicates a configurable dedicated value of an RNTI. The configurable dedicated value of the RNTI may be associated with at least one of a PDCCH payload scrambling sequence, a hash function corresponding to a CCE index, or a CRC scrambling sequence. In some aspects, the network node 402 may transmit, and the UE 120 may receive, an RRC configuration that indicates a mapping between at least one search space and at least one G-RNTI of the plurality of G-RNTIs. Any of the configurations described above may be included in a CFR configuration and/or an MBS configuration, among other examples.

As shown by reference number 408, the network node 402 may generate an MBS PDCCH communication using a scrambling sequence, a hash function, and/or a CRC sequence, among other examples, as described herein. As shown by reference number 410, the UE 404 may monitor a search space for at least one MBS PDCCH communication.

For example, in some aspects, the UE 404 may monitor a search space associated with a PDCCH corresponding to an MBS PDSCH for at least one MBS PDCCH communication having a payload that is scrambled according to a PDCCH payload scrambling sequence based on a value of an RNTI. The value of the RNTI may be equal to a G-RNTI or zero. The value of the RNTI may be equal to zero, and the UE 404 may receive a configuration of a PDCCH DMRS scrambling ID for a CORESET associated with the search space. In some aspects, the UE 404 does not receive a configuration of a PDCCH DMRS scrambling ID for a CORESET associated with the search space. For example, payload scrambling for PDCCH scheduling MBS PDSCH may be based on $n_{RNTI}=0$. This may be the case regardless of whether a pdcch-DMRS-ScramblingID parameter is provided for a controlResourceSet for a CORESET associated with the search space. In some aspects, the value of the RNTI is equal to zero, and a PDCCH DMRS scrambling ID is not supported for a CORESET associated with the search space. For example, the payload scrambling for PDCCH scheduling MBS PDSCH may be based on $n_{RNTI}=0$ and pdcch-DMRS-ScramblingID may not be supported for the controlResourceSet for a CORESET associated with the search space.

In some aspects, the value of the RNTI may be equal to the G-RNTI, and the UE 404 may receive a configuration of a PDCCH DMRS scrambling ID for a CORESET associated with the search space. The value of the RNTI may be equal to the G-RNTI, and the UE 404 may not receive a configuration of a PDCCH DMRS scrambling ID for a CORESET associated with the search space. For example, payload scrambling for PDCCH scheduling MBS PDSCH may be based on $n_{RNTI}=$G-RNTI regardless of whether or not pdcch-DMRS-ScramblingID is provided for the controlResourceSet for a CORESET associated with the search space.

In some aspects, the network node 402 may transmit, and the UE 404 may receive a configuration of a PDCCH DMRS scrambling ID for a CORESET associated with the search space, and the value of the RNTI may be equal to the G-RNTI based on the network node 402 transmitting and/or the UE 404 receiving the configuration of the PDCCH DMRS scrambling ID. In some aspects, the UE 404 may not receive a configuration of a PDCCH DMRS scrambling ID for a CORESET associated with the search space, and the value of the RNTI may be equal to zero based on the network node 402 not transmitting and/or the UE 404 not receiving the configuration of the PDCCH DMRS scrambling ID. For example, payload scrambling for PDCCH scheduling MBS PDSCH may be based on $n_{RNTI}=$G-RNTI if pdcch-DMRS-ScramblingID is provided for the controlResourceSet for the CORESET associated with the search space and based on $n_{RNTI}=0$ otherwise.

In some aspects, the network node 402 may transmit, and the UE 404 may receive a configuration of a PDCCH DMRS scrambling ID for a CORESET associated with the search space; and the network node 402 may transmit, and the UE 404 may receive, a dedicated configuration indication that configures the search space. The value of the RNTI may be equal to the G-RNTI based on the network node 402 transmitting and/or the UE 404 receiving the configuration of the PDCCH DMRS scrambling ID and the dedicated configuration indication. In some aspects, the network node 402 may transmit, and the UE 404 may receive, the dedicated configuration indication by transmitting and receiving, respectively, a dedicated RRC message and/or RRC parameter. The value of the RNTI may be equal to zero based on a determination that the network node 402 has not transmitted and/or the UE 404 has not received, a configuration of a PDCCH DMRS scrambling ID for a CORESET associated with the search space and a dedicated configuration indication that configures the search space. For example, payload scrambling for PDCCH scheduling MBS PDSCH may be based on $n_{RNTI}$=G-RNTI if pdcch-DMRS-ScramblingID is provided for the controlResourceSet for the CORESET associated with the search space and if the search space is configured by UE-dedicated RRC message (or configured with dedicated RRC parameter), and based on $n_{RNTI}$=0 otherwise.

In some aspects, the network node 402 may transmit, and the UE 404 may receive a configuration of a PDCCH DMRS scrambling ID for a CORESET associated with the search space, and the UE 404 may monitor the search space by monitoring the search space only in a an RRC connected state. The value of the RNTI may be equal to the G-RNTI based on receiving the configuration of the PDCCH DMRS scrambling ID and monitoring the search space only in the RRC connected state. The value of the RNTI may be equal to zero based on a determination that the network node 402 has not transmitted and/or the UE 404 has not received, a configuration of a PDCCH DMRS scrambling ID for a CORESET associated with the search space and a determination that the search space is not monitored only in an RRC connected state. For example, payload scrambling for PDCCH scheduling MBS PDSCH may be based on $n_{RNTI}$=G-RNTI if pdcch-DMRS-ScramblingID is provided for the controlResourceSet for a CORESET associated with the search space and if the search space is the one monitored only in RRC_connected state, and based on n $n_{RNTI}$=0 otherwise.

In some aspects, the at least one MBS PDCCH communication may include a DCI transmission that schedules an MBS PDSCH. The value of the RNTI may be equal to zero based on a determination that a DCI format of the DCI transmission is a DCI format 1_0 and the value of the RNTI may be equal to the G-RNTI based on a determination that a DCI format of the DCI transmission is not a DCI format 1_0 (e.g., where the DCI transmission format is a DCI format 1_1 or 1_2). For example, payload scrambling for PDCCH scheduling MBS PDSCH may be based on $n_{RNTI}$=0 if the PDCCH scheduling MBS PDSCH is a DCI format 1_0 and based on $n_{RNTI}$=G-RNTI otherwise.

In some aspects, the UE 404 may monitor a search space for at least one MBS PDCCH communication having a CCE index corresponding to a hash function that is based on a value of an RNTI, where the value of the RNTI is equal to a G-RNTI or zero. In some aspects, the value of the RNTI is equal to zero. For example, the hash function for the search space may be based on $n_{RNTI}$=0. In some aspects, the value of the RNTI may be equal to the G-RNTI. For example, the hash function for the search space may be based on $n_{RNTI}$=G-RNTI.

In some aspects, the network node 402 may transmit, and the UE 404 may receive an indication of an RRC parameter that enables the RNTI to equal the G-RNTI, and the value of the RNTI may be equal to the G-RNTI based on the network node 402 transmitting and/or the UE 404 receiving the indication of the RRC parameter. The value of the RNTI may be equal to zero based on a determination that the network node 402 has not transmitted and/or the UE 404 has not received, an indication of an RRC parameter that enables the RNTI to equal the G-RNTI. For example, a hash function for the search space may be based on $n_{RNTI}$=G-RNTI if the UE is configured with a RRC parameter enabling $n_{RNTI}$=G-RNTI. The hash function may be based on $n_{RNTI}$=0 if the UE is not configured with a RRC parameter enabling $n_{RNTI}$=G-RNTI.

In some aspects, the network node 402 may transmit, and the UE 404 may receive a dedicated configuration indication that configures the search space, and the value of the RNTI may be equal to the G-RNTI based on the network node 402 transmitting and/or the UE 404 receiving, the dedicated configuration indication. In some aspects, the network node 402 may transmit, and the UE 404 may receive, the dedicated configuration indication by transmitting and receiving, respectively, a dedicated RRC message and/or a dedicated RRC parameter. The value of the RNTI may be equal to zero based on a determination that the network node 402 has not transmitted and/or that the UE 404 has not received, a dedicated configuration indication that configures the search space. For example, in some aspects, the hash function for the search space may be based on $n_{RNTI}$=G-RNTI if the Type-x CSS is configured by UE-dedicated RRC message (or configured with dedicated RRC parameter) and based on $n_{RNTI}$=0 otherwise.

In some aspects, the UE 404 may monitor the search space by monitoring the search space only in an RRC connected state, and the value of the RNTI may be equal to the G-RNTI based on the UE 404 monitoring the search space only in the RRC connected state. In some aspects, the value of the RNTI may be equal to zero based on a determination that the search space is not monitored only in an RRC connected state. For example, the hash function for the search space may be based on $n_{RNTI}$=G-RNTI if the search space is the one monitored only in RRC connected state and based on $n_{RNTI}$=0 otherwise.

In some aspects, as described above in connection with the scrambling sequence, for the hash function, the at least one MBS PDCCH communication may include a DCI transmission that schedules an MBS physical downlink shared channel and the value of the RNTI may be equal to zero based on a determination that a DCI format of the DCI transmission is a DCI format 1_0. The value of the RNTI may be equal to the G-RNTI based on a determination that a DCI format of the DCI transmission is not a DCI format 1_0.

In some aspects, for a downlink cell, the UE 404 may monitor PDCCH for MBS PDSCHs with multiple G-RNTIs. The network node 402 may transmit, and the UE 404 may receive, an MBS configuration that configures a plurality of G-RNTIs for a cell and the UE 404 may monitor, based on the MBS configuration, at least one search space of the cell for at least one MBS PDCCH communication that schedules at least one MBS PDSCH communication of a plurality of MBS PDSCH communications. Each MBS PDSCH communication of the plurality of MBS PDSCH communications may be associated with a respective G-RNTI of the plurality of G-RNTIs. For example, different G-RNTIs may be used for different multicast services. At least one G-RNTI of the plurality of G-RNTIs may include a value of an RNTI associated with at least one of a PDCCH payload scrambling sequence, a hash function corresponding to a CCE index, or a CRC scrambling sequence.

In some aspects, for example, different G-RNTIs may be used for scrambling, hash functions, and/or CRC scrambling for DCIs for MBS PDSCHs associated with different G-RNTIs. In some aspects, the value of the RNTI may be equal to the at least one G-RNTI and at least one additional value of the RNTI may be equal to at least one additional G-RNTI of the plurality of G-RNTIs. The value of the RNTI may be equal to the G-RNTI and at least one additional payload may be scrambled according to the PDCCH payload scrambling sequence based on at least one additional value of the RNTI, where the at least one additional value of the RNTI is equal to at least one additional G-RNTI of the plurality of G-RNTIs. In some aspects, the value of the RNTI may be equal to the G-RNTI and at least one additional CCE index may correspond to at least one additional hash function that is based on at least one additional value of the RNTI, where the at least one additional value of the RNTI is equal to at least one additional G-RNTI of the plurality of G-RNTIs.

In some aspects, one RNTI value may be used for scrambling, hash function, and/or CRC scrambling for DCIs for MBS PDSCHs associated with different G-RNTIs. For example, in some aspects, at least one additional value of the RNTI may be equal to the value of the RNTI. At least one additional payload may be scrambled according to the PDCCH payload scrambling sequence based on at least one additional value of the RNTI, where the at least one additional value of the RNTI is equal to the value of the RNTI. At least one additional hash function may be based on at least one additional value of the RNTI, where the at least one additional value of the RNTI is equal to the value of the RNTI.

In some aspects, the value of the RNTI may be equal to a specified G-RNTI of the plurality of G-RNTIs. For example, the RNTI may be equal to a lowest value among the plurality of G-RNTIs and/or a highest value among the plurality of G-RNTIs, among other examples. In some aspects, the RNTI may be equal to a specified G-RNTI of a G-RNTI list. For example, the plurality of G-RNTIs may be configured using a G-RNTI list and the value of the RNTI may be equal to a first listed G-RNTI of the G-RNTI list and/or a last listed G-RNTI of the G-RNTI list, among other examples. In some aspects, the G-RNTI may be mapped to a particular multicast service (e.g., multicast service having the lowest multicast service ID and/or the highest multicast service ID, among other examples).

In some aspects, the RNTI may have a value that is separately configurable. In some aspects, the value may be separately configurable specifically for the hash function. In some aspects, the network node 402 may transmit, and the UE 404 may receive a configuration that indicates a configurable dedicated value of an RNTI. The configurable dedicated value of the RNTI may be associated with at least one of a PDCCH payload scrambling sequence, a hash function corresponding to a CCE index, or a CRC scrambling sequence. In some aspects, for example, multicast UEs may be configured with a value for $n_{RNTI}$ for scrambling, hash function, and/or CRC scrambling for DCIs for MBS PDSCHs associated with different G-RNTIs. The multicast service may include a specified multicast service ID of a plurality of multicast service IDs. In some aspects, the value of the RNTI may include a configurable dedicated value.

In some aspects, where the at least one MBS PDCCH communication includes a plurality of MBS PDCCH communications, PDCCHs for MBS PDSCHs associated with different G-RNTIs may be monitored on the same search space set. In some aspects, for example, the mapping from G-RNTI to the search space may be one to one. In some aspects, PDCCHs for MBS PDSCHs associated with different G-RNTIs may be monitored on different search space sets. For example, the mapping from G-RNTI to the search space may be many to one. In some aspects, the mapping between a G-RNTI and a search space associated with a PDCCH corresponding to an MBS PDSCH may be configured by RRC signaling. For example, the network node 402 may transmit, and the UE 404 may receive, an RRC configuration that indicates a mapping between at least one search space and at least one G-RNTI of the plurality of G-RNTIs.

As shown by reference number 412, the network node 402 may transmit, and the UE 404 may receive, the at least one MBS PDCCH communication.

As indicated above, FIG. 4 is provided as an example. Other examples may differ from what is described with respect to FIG. 4.

Figure 5:
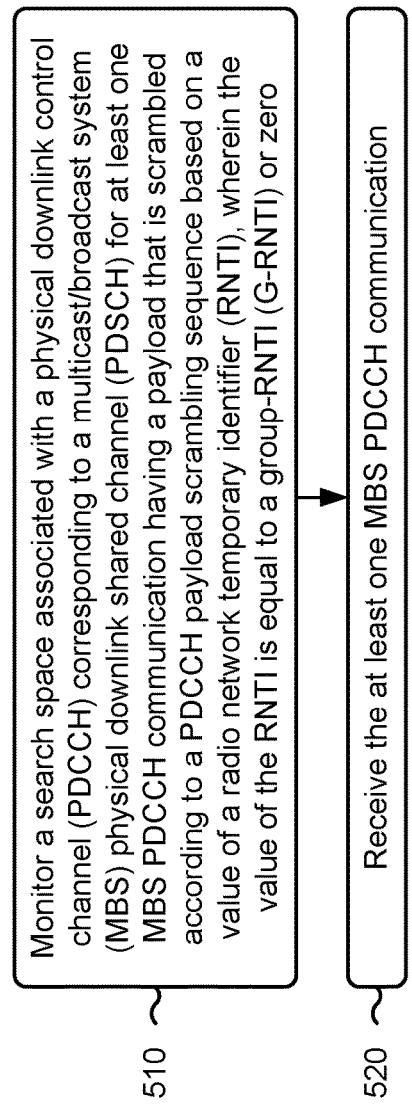
FIGS. 5-10 are diagrams illustrating example processes associated with PDCCH transmissions for MBS services, in accordance with the present disclosure.

FIG. 5 is a diagram illustrating an example process 500 performed, for example, by a UE, in accordance with the present disclosure. Example process 500 is an example where the UE (e.g., UE 404) performs operations associated with PDCCH transmissions for MBS services.

As shown in FIG. 5, in some aspects, process 500 may include monitoring a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to a G-RNTI or zero (block 510). For example, the UE (e.g., using communication manager 140 and/or reception component 1102, depicted in FIG. 11) may monitor a search space for at least one MBS PDCCH communication having a payload that is scrambled according to a PDCCH payload scrambling sequence based on a value of an RNTI, wherein the value of the RNTI is equal to a G-RNTI or zero, as described above.

As further shown in FIG. 5, in some aspects, process 500 may include receiving the at least one MBS PDCCH communication (block 520). For example, the UE (e.g., using communication manager 140 and/or reception component 1102, depicted in FIG. 11) may receive the at least one MBS PDCCH communication, as described above.

Process 500 may include additional aspects, such as any single aspect or any combination of aspects described below and/or in connection with one or more other processes described elsewhere herein.

In a first aspect, the value of the RNTI is equal to zero, the method further comprising receiving a configuration of a PDCCH DMRS scrambling ID for a CORSET associated with the search space.

In a second aspect, the value of the RNTI is equal to zero, and wherein the UE does not receive a configuration of a PDCCH DMRS scrambling ID for a CORESET associated with the search space.

In a third aspect, the value of the RNTI is equal to zero, and a PDCCH DMRS scrambling ID is not supported for a control resource set associated with the search space.

In a fourth aspect, the value of the RNTI is equal to the G-RNTI, the method further comprising receiving a configuration of a PDCCH DMRS scrambling ID for a CORESET associated with the search space.

In a fifth aspect, the value of the RNTI is equal to the G-RNTI, and wherein the UE does not receive a configuration of a PDCCH DMRS scrambling ID for a CORESET associated with the search space.

In a sixth aspect, process 500 includes receiving a configuration of a PDCCH DMRS scrambling ID for a CORESET associated with the search space, wherein the value of the RNTI is equal to the G-RNTI based on receiving the configuration of the PDCCH DMRS scrambling ID.

In a seventh aspect, the UE does not receive a configuration of a PDCCH DMRS scrambling ID for a CORESET associated with the search space, and wherein the value of the RNTI is equal to zero based on the UE not receiving the configuration of the PDCCH DMRS scrambling ID.

In an eighth aspect, process 500 includes receiving a configuration of a PDCCH DMRS scrambling ID for a CORESET associated with the search space and receiving a dedicated configuration indication that configures the search space, wherein the value of the RNTI is equal to the G-RNTI based on receiving the configuration of the PDCCH DMRS scrambling ID and the dedicated configuration indication.

In a ninth aspect, alone or in combination with the eighth aspect, receiving the dedicated configuration indication comprises receiving a dedicated RRC message.

In a tenth aspect, alone or in combination with one or more of the eighth through ninth aspects, receiving the dedicated configuration indication comprises receiving an RRC message that indicates a dedicated parameter.

In an eleventh aspect, the value of the RNTI is equal to zero based on a determination that the UE has not received a configuration of a PDCCH DMRS scrambling ID for a CORESET associated with the search space and a dedicated configuration indication that configures the search space.

In a twelfth aspect, process 500 includes receiving a configuration of a PDCCH DMRS scrambling ID for a CORESET associated with the search space, wherein monitoring the search space comprises monitoring the search space only in an RRC connected state, and wherein the value of the RNTI is equal to the G-RNTI based on receiving the configuration of the PDCCH DMRS scrambling ID and monitoring the search space only in the RRC connected state.

In a thirteenth aspect, alone or in combination with one or more of the first through twelfth aspects, the value of the RNTI is equal to zero based on a determination that the UE has not received a configuration of a PDCCH DMRS scrambling ID for a CORESET associated with the search space and a determination that the search space is not monitored only in a radio resource control connected state.

In a fourteenth aspect, alone or in combination with one or more of the first through thirteenth aspects, the at least one MBS PDCCH communication comprises a DCI transmission that schedules an MBS PDSCH.

In a fifteenth aspect, alone or in combination with the fourteenth aspect, the value of the RNTI is equal to zero based on a determination that a DCI format of the DCI transmission is a DCI format 1_0.

In a sixteenth aspect, alone or in combination with the fifteenth aspect, the value of the RNTI is equal to the G-RNTI based on a determination that a DCI format of the DCI transmission is not a DCI format 1_0.

In a seventeenth aspect, alone or in combination with one or more of the first through sixteenth aspects, the at least one MBS PDCCH communication schedules a plurality of MBS PDSCH communications, wherein each MBS PDSCH communication of the plurality of MBS PDSCH communications is associated with a respective G-RNTI of a plurality of G-RNTIs that includes the G-RNTI.

In an eighteenth aspect, alone or in combination with the seventeenth aspect, the value of the RNTI is equal to the G-RNTI and wherein at least one additional payload is scrambled according to the PDCCH payload scrambling sequence based on at least one additional value of the RNTI, wherein the at least one additional value of the RNTI is equal to at least one additional G-RNTI of the plurality of G-RNTIs.

In a nineteenth aspect, alone or in combination with the seventeenth aspect, at least one additional payload is scrambled according to the PDCCH payload scrambling sequence based on at least one additional value of the RNTI, wherein the at least one additional value of the RNTI is equal to the value of the RNTI.

In a twentieth aspect, alone or in combination with the nineteenth aspect, the value of the RNTI is equal to a specified G-RNTI of the plurality of G-RNTIs.

In a twenty-first aspect, alone or in combination with one or more of the nineteenth through twentieth aspects, the plurality of G-RNTIs are configured using a G-RNTI list, and wherein the value of the RNTI is equal to a first listed G-RNTI of the G-RNTI list.

In a twenty-second aspect, alone or in combination with one or more of the nineteenth through twenty-first aspects, the value of the RNTI is equal to a G-RNTI mapped to a multicast service.

In a twenty-third aspect, alone or in combination with the twenty-second aspect, the multicast service comprises a specified multicast service ID of a plurality of multicast service IDs.

In a twenty-fourth aspect, alone or in combination with the nineteenth aspect, the value of the RNTI comprises a configurable dedicated value.

In a twenty-fifth aspect, alone or in combination with one or more of the seventeenth through twenty-fourth aspects, the at least one MBS PDCCH communication comprises a plurality of MBS PDCCH communications.

In a twenty-sixth aspect, alone or in combination with one or more of the nineteenth through twenty-fifth aspects, process 500 includes monitoring at least one additional search space for at least one additional MBS PDCCH that schedules at least one additional MBS PDSCH communication associated with at least one additional G-RNTI of the plurality of G-RNTIs.

In a twenty-seventh aspect, alone or in combination with one or more of the first through twenty-sixth aspects, process 500 includes receiving an RRC configuration that indicates a mapping between the search space and the G-RNTI.

In a twenty-eighth aspect, alone or in combination with one or more of the first through third aspects, the at least one MBS PDCCH communication comprises a CRC scrambled using a G-RNTI.

In a twenty-ninth aspect, alone or in combination with the twenty-eighth aspect, the at least one MBS PDCCH communication schedules a plurality of MBS PDSCH communications, wherein each MBS PDSCH communication of the plurality of MBS PDSCH communications is associated with a respective group RNTI (G-RNTI) of a plurality of G-RNTIs that includes the G-RNTI.

In a thirtieth aspect, alone or in combination with the twenty-ninth aspect, wherein at least one additional payload is scrambled according to the PDCCH payload scrambling sequence based on at least one additional value of the G-RNTI, wherein the at least one additional value of the RNTI is equal to at least one additional G-RNTI of the plurality of G-RNTIs.

In a thirty-first aspect, alone or in combination with one or more of the twenty-ninth or thirtieth aspects, at least one additional payload is scrambled according to the PDCCH payload scrambling sequence based on at least one additional value of the RNTI, wherein the at least one additional value of the G-RNTI is equal to the value of the G-RNTI.

In a thirty-second aspect, alone or in combination with one or more of the twenty-ninth through thirty-first aspects, the value of the G-RNTI is equal to a specified G-RNTI of the plurality of G-RNTIs.

In a thirty-third aspect, alone or in combination with one or more of the twenty-ninth through thirty-second aspects, the plurality of G-RNTIs are configured using a G-RNTI list, and wherein the value of the G-RNTI is equal to a first listed G-RNTI of the G-RNTI list.

In a thirty-fourth aspect, alone or in combination with one or more of the twenty-ninth through thirty-third aspects, the value of the G-RNTI is equal to a G-RNTI mapped to a multicast service.

In a thirty-fifth aspect, alone or in combination with the thirty-fourth aspect, the multicast service comprises a specified multicast service ID of a plurality of multicast service IDs.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
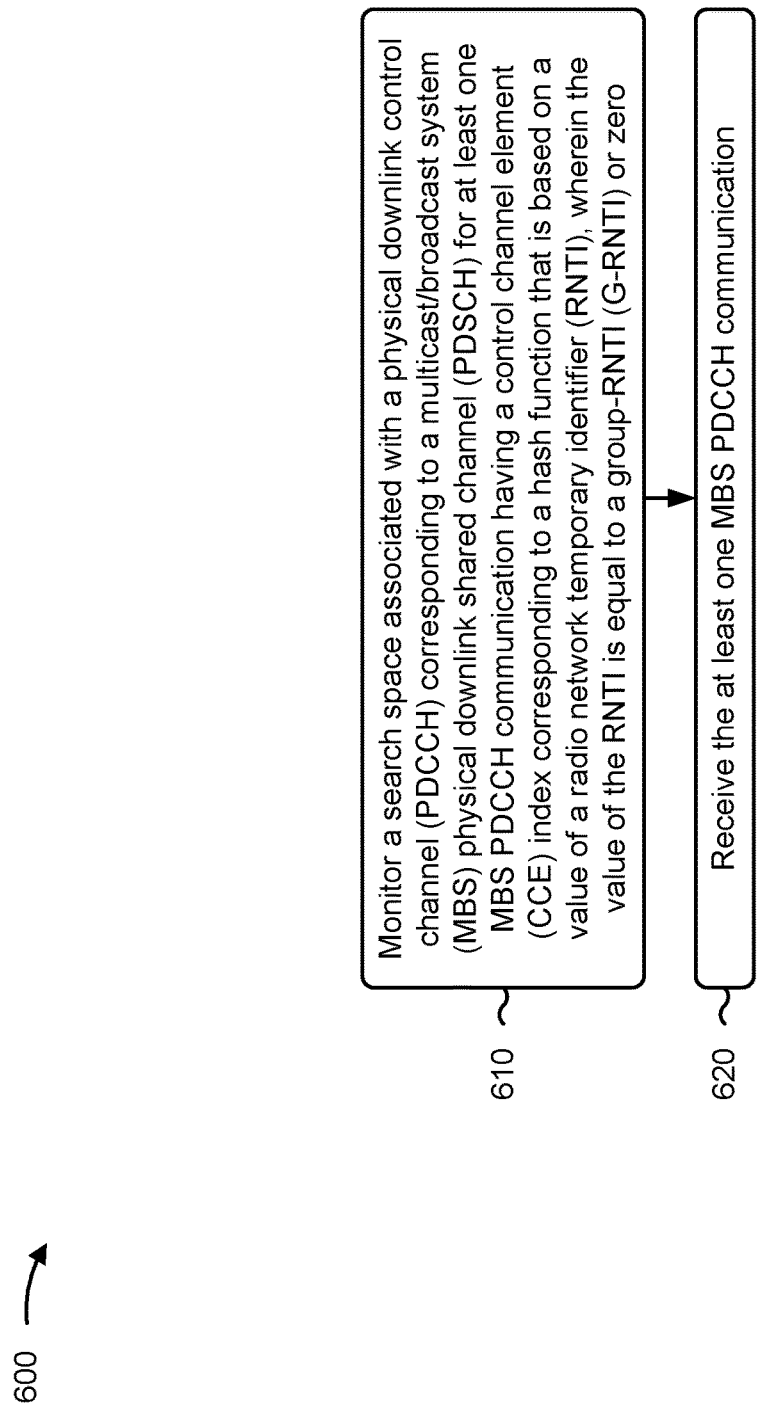

FIG. 6 is a diagram illustrating an example process 600 performed, for example, by a UE, in accordance with the present disclosure. Example process 600 is an example where the UE (e.g., UE 404) performs operations associated with PDCCH transmissions for MBS services.

As shown in FIG. 6, in some aspects, process 600 may include monitoring a search space associated with a PDCCH corresponding to an MBS PDSCH for at least one MBS PDCCH communication having a CCE index corresponding to a hash function that is based on a value of an RNTI, wherein the value of the RNTI is equal to a G-RNTI or zero (block 610). For example, the UE (e.g., using communication manager 140 and/or reception component 1102, depicted in FIG. 11) may monitor a search space for at least one MBS PDCCH communication having a CCE index corresponding to a hash function that is based on a value of an RNTI, wherein the value of the RNTI is equal to a G-RNTI or zero, as described above.

As further shown in FIG. 6, in some aspects, process 600 may include receiving the at least one MBS PDCCH communication (block 620). For example, the UE (e.g., using communication manager 140 and/or reception component 1102, depicted in FIG. 11) may receive the at least one MBS PDCCH communication, as described above.

Process 600 may include additional aspects, such as any single aspect or any combination of aspects described below and/or in connection with one or more other processes described elsewhere herein.

In a first aspect, the value of the RNTI is equal to zero.

In a second aspect, the value of the RNTI is equal to the G-RNTI.

In a third aspect, process 600 includes receiving an indication of an RRC parameter that enables the RNTI to equal the G-RNTI, wherein the value of the RNTI is equal to the G-RNTI based on receiving the indication of the RRC parameter.

In a fourth aspect, the value of the RNTI is equal to zero based on a determination that the UE has not received an indication of a radio resource control parameter that enables the RNTI to equal the G-RNTI.

In a fifth aspect, process 600 includes receiving a dedicated configuration indication that configures the search space, wherein the value of the RNTI is equal to the G-RNTI based on receiving the dedicated configuration indication.

In a sixth aspect, alone or in combination with the fifth aspect, receiving the dedicated configuration indication comprises receiving a dedicated RRC message.

In a seventh aspect, alone or in combination with one or more of the fifth through sixth aspects, receiving the dedicated configuration indication comprises receiving an RRC message that indicates a dedicated parameter.

In an eighth aspect, the value of the RNTI is equal to zero based on a determination that the UE has not received a dedicated configuration indication that configures the search space.

In a ninth aspect, monitoring the search space comprises monitoring the search space only in an RRC connected state, and wherein the value of the RNTI is equal to the G-RNTI based on monitoring the search space only in the RRC connected state.

In a tenth aspect, the value of the RNTI is equal to zero based on a determination that the search space is not monitored only in an RRC connected state.

In an eleventh aspect, alone or in combination with one or more of the first through tenth aspects, the at least one MBS PDCCH communication comprises a DCI transmission that schedules an MBS PDSCH.

In a twelfth aspect, alone or in combination with the eleventh aspect, the value of the RNTI is equal to zero based on a determination that a DCI format of the DCI transmission is a DCI format 1_0.

In a thirteenth aspect, alone or in combination with the eleventh aspect, the value of the RNTI is equal to the G-RNTI based on a determination that a DCI format of the DCI transmission is not a DCI format 1_0.

In a fourteenth aspect, alone or in combination with one or more of the first through thirteenth aspects, the at least one MBS PDCCH communication schedules a plurality of MBS PDSCH communications, wherein each MBS PDSCH communication of the plurality of MBS PDSCH communications is associated with a respective G-RNTI of a plurality of G-RNTIs that includes the G-RNTI.

In a fifteenth aspect, alone or in combination with the fourteenth aspect, the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

In a sixteenth aspect, alone or in combination with the fourteenth aspect, at least one additional hash function is based on at least one additional value of the RNTI, wherein the at least one additional value of the RNTI is equal to the value of the RNTI.

In a seventeenth aspect, alone or in combination with the sixteenth aspect, the value of the RNTI is equal to a specified G-RNTI of the plurality of G-RNTIs.

In an eighteenth aspect, alone or in combination with one or more of the sixteenth through seventeenth aspects, the plurality of G-RNTIs are configured using a G-RNTI list, and wherein the value of the RNTI is equal to a first listed G-RNTI of the G-RNTI list.

In a nineteenth aspect, alone or in combination with one or more of the sixteenth through eighteenth aspects, the value of the RNTI is equal to a G-RNTI mapped to a multicast service.

In a twentieth aspect, alone or in combination with the nineteenth aspect, the multicast service comprises a specified multicast service ID of a plurality of multicast service IDs.

In a twenty-first aspect, alone or in combination with the sixteenth aspect, the value of the RNTI comprises a configurable dedicated value.

In a twenty-second aspect, alone or in combination with one or more of the fourteenth through twenty-first aspects, the at least one MBS PDCCH communication comprises a plurality of MBS PDCCH communications.

In a twenty-third aspect, alone or in combination with one or more of the fourteenth through twenty-second aspects, process 600 includes monitoring at least one additional search space for at least one additional MBS PDCCH that schedules at least one additional MBS PDSCH communication associated with at least one additional G-RNTI of the plurality of G-RNTIs.

In a twenty-fourth aspect, alone or in combination with one or more of the first through twenty-third aspects, process 600 includes receiving an RRC configuration that indicates a mapping between the search space and the G-RNTI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
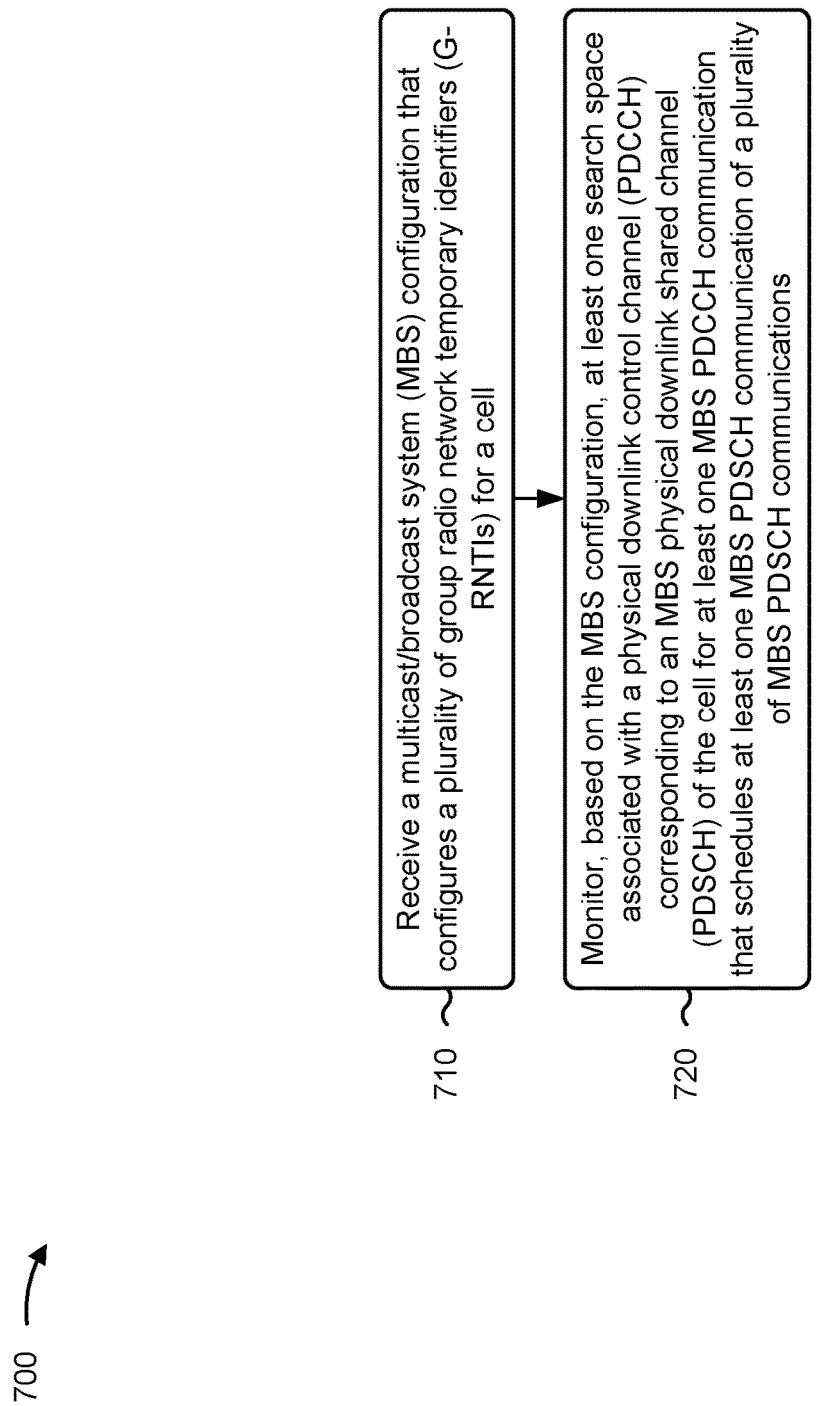

FIG. 7 is a diagram illustrating an example process 700 performed, for example, by a UE, in accordance with the present disclosure. Example process 700 is an example where the UE (e.g., UE 404) performs operations associated with PDCCH transmissions for MBS services.

As shown in FIG. 7, in some aspects, process 700 may include receiving an MBS configuration that configures a plurality of G-RNTIs for a cell (block 710). For example, the UE (e.g., using communication manager 140 and/or reception component 1102, depicted in FIG. 11) may receive an MBS configuration that configures a plurality of G-RNTIs for a cell, as described above.

As further shown in FIG. 7, in some aspects, process 700 may include monitoring, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications (block 720). For example, the UE (e.g., using communication manager 140 and/or reception component 1102, depicted in FIG. 11) may monitor, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications, as described above.

Process 700 may include additional aspects, such as any single aspect or any combination of aspects described below and/or in connection with one or more other processes described elsewhere herein.

In a first aspect, each MBS PDSCH communication of the plurality of MBS PDSCH communications is associated with a respective G-RNTI of the plurality of G-RNTIs.

In a second aspect, alone or in combination with the first aspect, at least one G-RNTI of the plurality of G-RNTIs comprises a value of an RNTI associated with at least one of a PDCCH payload scrambling sequence, a hash function corresponding to a CCE index, or a CRC scrambling sequence.

In a third aspect, alone or in combination with the second aspect, the value of the RNTI is equal to the at least one G-RNTI and wherein at least one additional value of the RNTI is equal to at least one additional G-RNTI of the plurality of G-RNTIs.

In a fourth aspect, alone or in combination with the second aspect, at least one additional value of the RNTI is equal to the value of the RNTI.

In a fifth aspect, alone or in combination with the fourth aspect, the value of the RNTI is equal to a specified G-RNTI of the plurality of G-RNTIs.

In a sixth aspect, alone or in combination with one or more of the fourth through fifth aspects, the plurality of G-RNTIs are configured using a G-RNTI list, and wherein the value of the RNTI is equal to a first listed G-RNTI of the G-RNTI list.

In a seventh aspect, alone or in combination with one or more of the third through sixth aspects, the at least one of the plurality of G-RNTIs is mapped to a multicast service.

In an eighth aspect, alone or in combination with the seventh aspect, the multicast service comprises a specified multicast service ID of a plurality of multicast service IDs.

In a ninth aspect, alone or in combination with one or more of the first through eighth aspects, process 700 includes receiving a configuration that indicates a configurable dedicated value of an RNTI, wherein the configurable dedicated value of the RNTI is associated with at least one of a PDCCH payload scrambling sequence, a hash function corresponding to a CCE index, or a CRC scrambling sequence.

In a tenth aspect, monitoring the at least one search space comprises monitoring one search space.

In an eleventh aspect, monitoring the at least one search space comprises monitoring a plurality of search spaces.

In a twelfth aspect, alone or in combination with one or more of the first through eleventh aspects, process 700 includes receiving an RRC configuration that indicates a mapping between the at least one search space and at least one G-RNTI of the plurality of G-RNTIs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
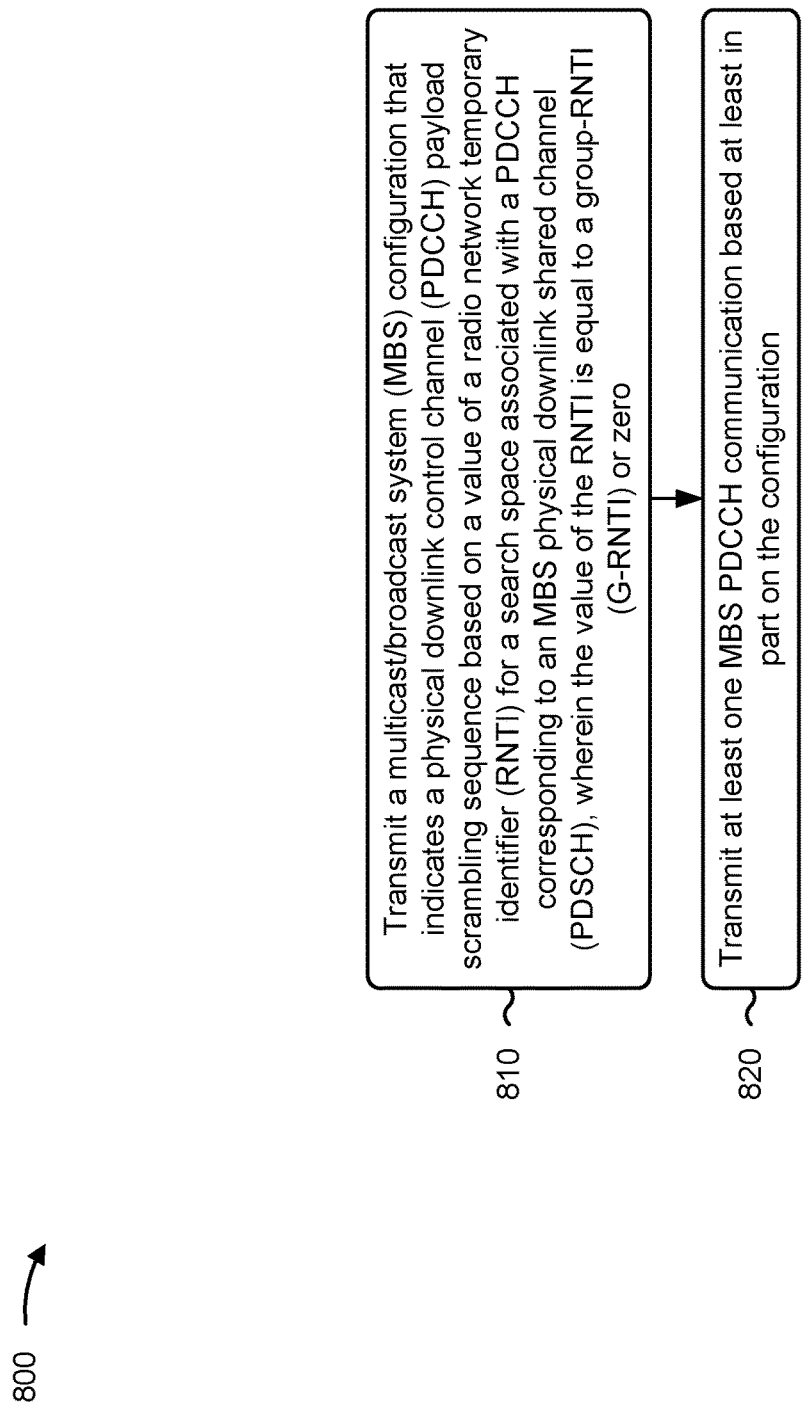

FIG. 8 is a diagram illustrating an example process 800 performed, for example, by a base station, in accordance with the present disclosure. Example process 800 is an example where the base station (e.g., network node 402) performs operations associated with PDCCH transmissions for MBS services.

As shown in FIG. 8, in some aspects, process 800 may include transmitting an MBS configuration that indicates a PDCCH payload scrambling sequence based on a value of an RNTI for a search space associated with a PDCCH corresponding to an MBS PDSCH, wherein the value of the RNTI is equal to a G-RNTI or zero (block 810). For example, the base station (e.g., using communication manager 150 and/or transmission component 1204, depicted in FIG. 12) may transmit an MBS configuration that indicates a PDCCH payload scrambling sequence based on a value of an RNTI for a search space associated with a PDCCH corresponding to an MBS PDSCH, wherein the value of the RNTI is equal to a G-RNTI or zero, as described above.

As further shown in FIG. 8, in some aspects, process 800 may include transmitting at least one MBS PDCCH communication based at least in part on the configuration (block 820). For example, the base station (e.g., using communication manager 150 and/or transmission component 1204, depicted in FIG. 12) may transmit at least one MBS PDCCH communication based at least in part on the configuration, as described above.

Process 800 may include additional aspects, such as any single aspect or any combination of aspects described below and/or in connection with one or more other processes described elsewhere herein.

In a first aspect, the value of the RNTI is equal to zero, the method further comprising transmitting a configuration of a PDCCH DMRS scrambling ID for a CORESET associated with the search space.

In a second aspect, the value of the RNTI is equal to zero, and wherein the base station does not transmit a configuration of a PDCCH DMRS scrambling ID for a CORESET associated with the search space.

In a third aspect, the value of the RNTI is equal to zero, and a PDCCH DMRS scrambling ID is not supported for a control resource set associated with the search space.

In a fourth aspect, the value of the RNTI is equal to the G-RNTI, the method further comprising transmitting a configuration of a PDCCH DMRS scrambling ID for a CORESET associated with the search space.

In a fifth aspect, the value of the RNTI is equal to the G-RNTI, and wherein the base station does not transmit a configuration of a PDCCH DMRS scrambling ID for a CORESET associated with the search space.

In a sixth aspect, process 800 includes transmitting a configuration of a PDCCH DMRS scrambling ID for a CORESET associated with the search space, wherein the value of the RNTI is equal to the G-RNTI based on transmitting the configuration of the PDCCH DMRS scrambling ID.

In a seventh aspect, the base station does not transmit a configuration of a PDCCH DMRS scrambling ID for a CORESET associated with the search space, and wherein the value of the RNTI is equal to zero based on the base station not transmitting the configuration of the PDCCH DMRS scrambling ID.

In an eighth aspect, process 800 includes transmitting a configuration of a PDCCH DMRS scrambling ID for a CORESET associated with the search space and transmitting a dedicated configuration indication that configures the search space, wherein the value of the RNTI is equal to the G-RNTI based on transmitting the configuration of the PDCCH DMRS scrambling ID and the dedicated configuration indication.

In a ninth aspect, alone or in combination with the eighth aspect, transmitting the dedicated configuration indication comprises transmitting a dedicated RRC message.

In a tenth aspect, alone or in combination with one or more of the eighth through ninth aspects, transmitting the dedicated configuration indication comprises transmitting an RRC message that indicates a dedicated parameter.

In an eleventh aspect, the value of the RNTI is equal to zero based on a determination that the base station has not transmitted a configuration of a PDCCH DMRS scrambling ID for a CORESET associated with the search space and a dedicated configuration indication that configures the search space.

In a twelfth aspect, 800 includes transmitting, to a UE, a configuration of a PDCCH DMRS scrambling ID for a CORESET associated with the search space and transmitting a monitoring configuration that indicates that the UE is to monitor the search space only in an RRC connected state, wherein the value of the RNTI is equal to the G-RNTI based on transmitting the configuration of the PDCCH DMRS scrambling ID and the monitoring configuration.

In a thirteenth aspect, the value of the RNTI is equal to zero based on a determination that the base station has not transmitted a configuration of a PDCCH DMRS scrambling ID for a CORESET associated with the search space and a determination that the search space is not monitored only in an RRC connected state.

In a fourteenth aspect, alone or in combination with one or more of the first through thirteenth aspects, the at least one MBS PDCCH communication comprises a DCI transmission that schedules an MBS physical downlink shared channel.

In a fifteenth aspect, alone or in combination with the fourteenth aspect, the value of the RNTI is equal to zero based on a determination that a DCI format of the DCI transmission is a DCI format 1_0.

In a sixteenth aspect, alone or in combination with the fourteenth aspect, the value of the RNTI is equal to the G-RNTI based on a determination that a DCI format of the DCI transmission is not a DCI format 1_0.

In a seventeenth aspect, alone or in combination with one or more of the first through sixteenth aspects, the at least one MBS PDCCH communication schedules a plurality of MBS PDSCH communications, wherein each MBS PDSCH communication of the plurality of MBS PDSCH communications is associated with a respective G-RNTI of a plurality of G-RNTIs that includes the G-RNTI.

In an eighteenth aspect, alone or in combination with the seventeenth aspects the value of the RNTI is equal to the G-RNTI and wherein at least one additional payload is scrambled according to the PDCCH payload scrambling sequence based on at least one additional value of the RNTI, wherein the at least one additional value of the RNTI is equal to at least one additional G-RNTI of the plurality of G-RNTIs.

In a nineteenth aspect, alone or in combination with the seventeenth aspect, at least one additional payload is scrambled according to the PDCCH payload scrambling sequence based on at least one additional value of the RNTI, wherein the at least one additional value of the RNTI is equal to the value of the RNTI.

In a twentieth aspect, alone or in combination with the nineteenth aspect, the value of the RNTI is equal to a specified G-RNTI of the plurality of G-RNTIs.

In a twenty-first aspect, alone or in combination with one or more of the nineteenth through twentieth aspects, the plurality of G-RNTIs are configured using a G-RNTI list, and wherein the value of the RNTI is equal to a first listed G-RNTI of the G-RNTI list.

In a twenty-second aspect, alone or in combination with one or more of the nineteenth through twenty-first aspects, the value of the RNTI is equal to a G-RNTI mapped to a multicast service.

In a twenty-third aspect, alone or in combination with the twenty-second aspect, the multicast service comprises a specified multicast service ID of a plurality of multicast service IDs.

In a twenty-fourth aspect, alone or in combination with the nineteenth aspect, the value of the RNTI comprises a configurable dedicated value.

In a twenty-fifth aspect, alone or in combination with one or more of the seventeenth through twenty-fourth aspects, the at least one MBS PDCCH communication comprises a plurality of MBS PDCCH communications.

In a twenty-sixth aspect, alone or in combination with one or more of the seventeenth through twenty-fifth aspects, process 800 includes transmitting a monitoring configuration that indicates that a UE is to monitor at least one additional search space for at least one additional MBS PDCCH that schedules at least one additional MBS PDSCH communication associated with at least one additional G-RNTI of the plurality of G-RNTIs.

In a twenty-seventh aspect, alone or in combination with one or more of the first through twenty-sixth aspects, process 800 includes transmitting an RRC configuration that indicates a mapping between the search space and the G-RNTI.

In a twenty-eighth aspect, alone or in combination with one or more of the first through third aspects, the at least one MBS PDCCH communication comprises a CRC scrambled using a G-RNTI.

In a twenty-ninth aspect, alone or in combination with the twenty-eighth aspect, the at least one MBS PDCCH communication schedules a plurality of MBS PDSCH communications, wherein each MBS PDSCH communication of the plurality of MBS PDSCH communications is associated with a respective group RNTI (G-RNTI) of a plurality of G-RNTIs that includes the G-RNTI.

In a thirtieth aspect, alone or in combination with the twenty-ninth aspect, wherein at least one additional payload is scrambled according to the PDCCH payload scrambling sequence based on at least one additional value of the G-RNTI, wherein the at least one additional value of the G-RNTI is equal to at least one additional G-RNTI of the plurality of G-RNTIs.

In a thirty-first aspect, alone or in combination with one or more of the twenty-ninth or thirtieth aspects, at least one additional payload is scrambled according to the PDCCH payload scrambling sequence based on at least one additional value of the RNTI, wherein the at least one additional value of the G-RNTI is equal to the value of the G-RNTI.

In a thirty-second aspect, alone or in combination with one or more of the twenty-ninth through thirty-first aspects, the value of the G-RNTI is equal to a specified G-RNTI of the plurality of G-RNTIs.

In a thirty-third aspect, alone or in combination with one or more of the twenty-ninth through thirty-second aspects, the plurality of G-RNTIs are configured using a G-RNTI list, and wherein the value of the G-RNTI is equal to a first listed G-RNTI of the G-RNTI list.

In a thirty-fourth aspect, alone or in combination with one or more of the twenty-ninth through thirty-third aspects, the value of the G-RNTI is equal to a G-RNTI mapped to a multicast service.

In a thirty-fifth aspect, alone or in combination with the thirty-fourth aspect, the multicast service comprises a specified multicast service ID of a plurality of multicast service IDs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
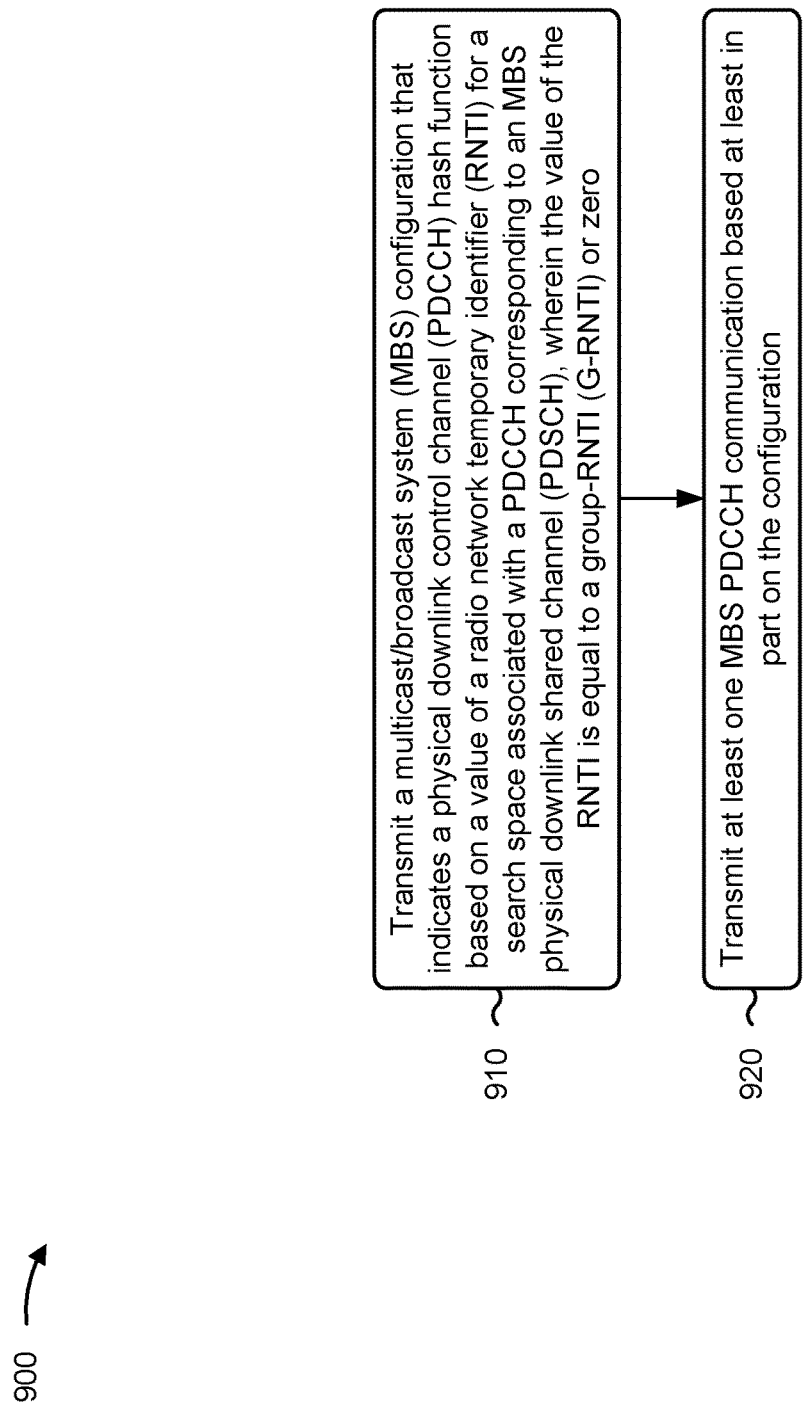

FIG. 9 is a diagram illustrating an example process 900 performed, for example, by a base station, in accordance with the present disclosure. Example process 900 is an example where the base station (e.g., network node 402) performs operations associated with PDCCH transmissions for MBS services.

As shown in FIG. 9, in some aspects, process 900 may include transmitting an MBS configuration that indicates a PDCCH hash function based on a value of an RNTI for a search space associated with a PDCCH corresponding to an MBS PDSCH, wherein the value of the RNTI is equal to a G-RNTI or zero (block 910). For example, the base station (e.g., using communication manager 150 and/or transmission component 1204, depicted in FIG. 12) may transmit an MBS configuration that indicates a PDCCH hash function based on a value of an RNTI for a search space associated with a PDCCH corresponding to an MBS PDSCH, wherein the value of the RNTI is equal to a G-RNTI or zero, as described above.

As further shown in FIG. 9, in some aspects, process 900 may include transmitting at least one MBS PDCCH communication based at least in part on the configuration (block 920). For example, the base station (e.g., using communication manager 150 and/or transmission component 1204, depicted in FIG. 12) may transmit at least one MBS PDCCH communication based at least in part on the configuration, as described above.

Process 900 may include additional aspects, such as any single aspect or any combination of aspects described below and/or in connection with one or more other processes described elsewhere herein.

In a first aspect, the value of the RNTI is equal to zero.

In a second aspect, the value of the RNTI is equal to the G-RNTI.

In a third aspect, process 900 includes transmitting an indication of an RRC parameter that enables the RNTI to equal the G-RNTI, wherein the value of the RNTI is equal to the G-RNTI based on transmitting the indication of the RRC parameter.

In a fourth aspect, the value of the RNTI is equal to zero based on a determination that the base station has not transmitted an indication of an RRC parameter that enables the RNTI to equal the G-RNTI.

In a fifth aspect, process 900 includes transmitting a dedicated configuration indication that configures the search space, wherein the value of the RNTI is equal to the G-RNTI based on transmitting the dedicated configuration indication.

In a sixth aspect, alone or in combination with the fifth aspect, transmitting the dedicated configuration indication comprises transmitting a dedicated RRC message.

In a seventh aspect, alone or in combination with one or more of the fifth through sixth aspects, transmitting the dedicated configuration indication comprises transmitting an RRC message that indicates a dedicated parameter.

In an eighth aspect, the value of the RNTI is equal to zero based on a determination that the base station has not transmitted a dedicated configuration indication that configures the search space.

In a ninth aspect, transmitting a monitoring configuration that indicates that a UE is to monitor the search space only in an RRC connected state, and wherein the value of the RNTI is equal to the G-RNTI based on the monitoring configuration.

In a tenth aspect, the value of the RNTI is equal to zero based on a determination that the search space is not monitored only in an RRC connected state.

In an eleventh aspect, alone or in combination with one or more of the first through tenth aspects, the at least one MBS PDCCH communication comprises a DCI transmission that schedules an MBS PDSCH.

In a twelfth aspect, alone or in combination with the eleventh aspect, the value of the RNTI is equal to zero based on a determination that a DCI format of the DCI transmission is a DCI format 1_0.

In a thirteenth aspect, alone or in combination with the eleventh aspect, the value of the RNTI is equal to the G-RNTI based on a determination that a DCI format of the DCI transmission is not a DCI format 1_0.

In a fourteenth aspect, alone or in combination with one or more of the first through thirteenth aspects, the at least one MBS PDCCH communication schedules a plurality of MBS PDSCH communications, wherein each MBS PDSCH communication of the plurality of MBS PDSCH communications is associated with a respective G-RNTI of a plurality of G-RNTIs that includes the G-RNTI.

In a fifteenth aspect, alone or in combination with the fourteenth aspect, the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

In a sixteenth aspect, alone or in combination with the fourteenth aspect, at least one additional hash function is based on at least one additional value of the RNTI, wherein the at least one additional value of the RNTI is equal to the value of the RNTI.

In a seventeenth aspect, alone or in combination with the sixteenth aspect, the value of the RNTI is equal to a specified G-RNTI of the plurality of G-RNTIs.

In an eighteenth aspect, alone or in combination with one or more of the sixteenth through seventeenth aspects, the plurality of G-RNTIs are configured using a G-RNTI list, and wherein the value of the RNTI is equal to a first listed G-RNTI of the G-RNTI list.

In a nineteenth aspect, alone or in combination with one or more of the sixteenth through eighteenth aspects, the value of the RNTI is equal to a G-RNTI mapped to a multicast service.

In a twentieth aspect, alone or in combination with the nineteenth aspect, the multicast service comprises a specified multicast service ID of a plurality of multicast service IDs.

In a twenty-first aspect, alone or in combination with the seventeenth aspect, the value of the RNTI comprises a configurable dedicated value.

In a twenty-second aspect, alone or in combination with one or more of the fifteenth through twenty-first aspects, the at least one MBS PDCCH communication comprises a plurality of MBS PDCCH communications.

In a twenty-third aspect, alone or in combination with one or more of the fifteenth through twenty-second aspects, process 900 includes transmitting a monitoring configuration that indicates that a UE is to monitor at least one additional search space for at least one additional MBS PDCCH that schedules at least one additional MBS PDSCH communication associated with at least one additional G-RNTI of the plurality of G-RNTIs.

In a twenty-fourth aspect, alone or in combination with one or more of the first through twenty-third aspects, process 900 includes transmitting an RRC configuration that indicates a mapping between the search space and the G-RNTI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
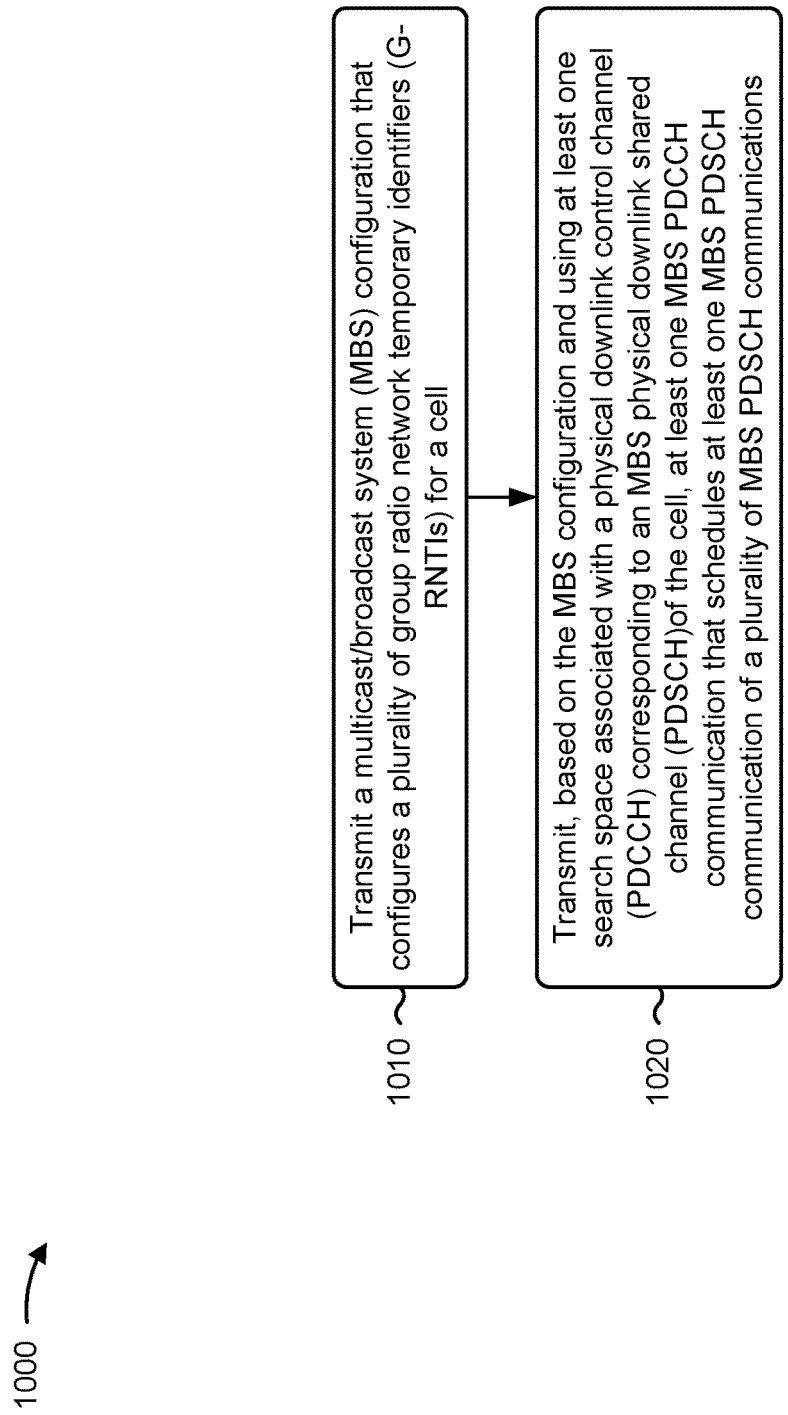

FIG. 10 is a diagram illustrating an example process 1000 performed, for example, by a base station, in accordance with the present disclosure. Example process 1000 is an example where the base station (e.g., network node 402) performs operations associated with PDCCH transmissions for MBS services.

As shown in FIG. 10, in some aspects, process 1000 may include transmitting an MBS configuration that configures a plurality of G-RNTIs for a cell (block 1010). For example, the base station (e.g., using communication manager 150 and/or transmission component 1204, depicted in FIG. 12) may transmit an MBS configuration that configures a plurality of G-RNTIs for a cell, as described above.

As further shown in FIG. 10, in some aspects, process 1000 may include transmitting, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications (block 1020). For example, the base station (e.g., using communication manager 150 and/or transmission component 1204, depicted in FIG. 12) may transmit, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications, as described above.

Process 1000 may include additional aspects, such as any single aspect or any combination of aspects described below and/or in connection with one or more other processes described elsewhere herein.

In a first aspect, each MBS PDSCH communication of the plurality of MBS PDSCH communications is associated with a respective G-RNTI of the plurality of G-RNTIs.

In a second aspect, alone or in combination with the first aspect, at least one G-RNTI of the plurality of G-RNTIs comprises a value of an RNTI associated with at least one of a PDCCH payload scrambling sequence, a hash function corresponding to a CCE index, or a CRC scrambling sequence.

In a third aspect, the value of the RNTI is equal to the at least one G-RNTI and wherein at least one additional value of the RNTI is equal to at least one additional G-RNTI of the plurality of G-RNTIs.

In a fourth aspect, at least one additional value of the RNTI is equal to the value of the RNTI.

In a fifth aspect, alone or in combination with the fourth aspect, the value of the RNTI is equal to a specified G-RNTI of the plurality of G-RNTIs.

In a sixth aspect, alone or in combination with one or more of the fourth through fifth aspects, the plurality of G-RNTIs are configured using a G-RNTI list, and wherein the value of the RNTI is equal to a first listed G-RNTI of the G-RNTI list.

In a seventh aspect, alone or in combination with one or more of the first through sixth aspects, the at least one of the plurality of G-RNTIs is mapped to a multicast service.

In an eighth aspect, alone or in combination with the seventh aspect, the multicast service comprises a specified multicast service ID of a plurality of multicast service IDs.

In a ninth aspect, alone or in combination with one or more of the first through eighth aspects, process 1000 includes transmitting a configuration that indicates a configurable dedicated value of an RNTI, wherein the configurable dedicated value of the RNTI is associated with at least one of a PDCCH payload scrambling sequence, a hash function corresponding to a CCE index, or a CRC scrambling sequence.

In a tenth aspect, alone or in combination with one or more of the first through ninth aspects, process 1000 includes transmitting a monitoring configuration that indicates that a UE is to monitor the at least one search space comprises monitoring one search space.

In an eleventh aspect, alone or in combination with one or more of the first through tenth aspects, process 1000 includes transmitting a monitoring configuration that indicates that a UE is to monitor the at least one search space comprises monitoring a plurality of search spaces.

In a twelfth aspect, alone or in combination with one or more of the first through eleventh aspects, process 1000 includes transmitting an RRC configuration that indicates a mapping between the at least one search space and at least one G-RNTI of the plurality of G-RNTIs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
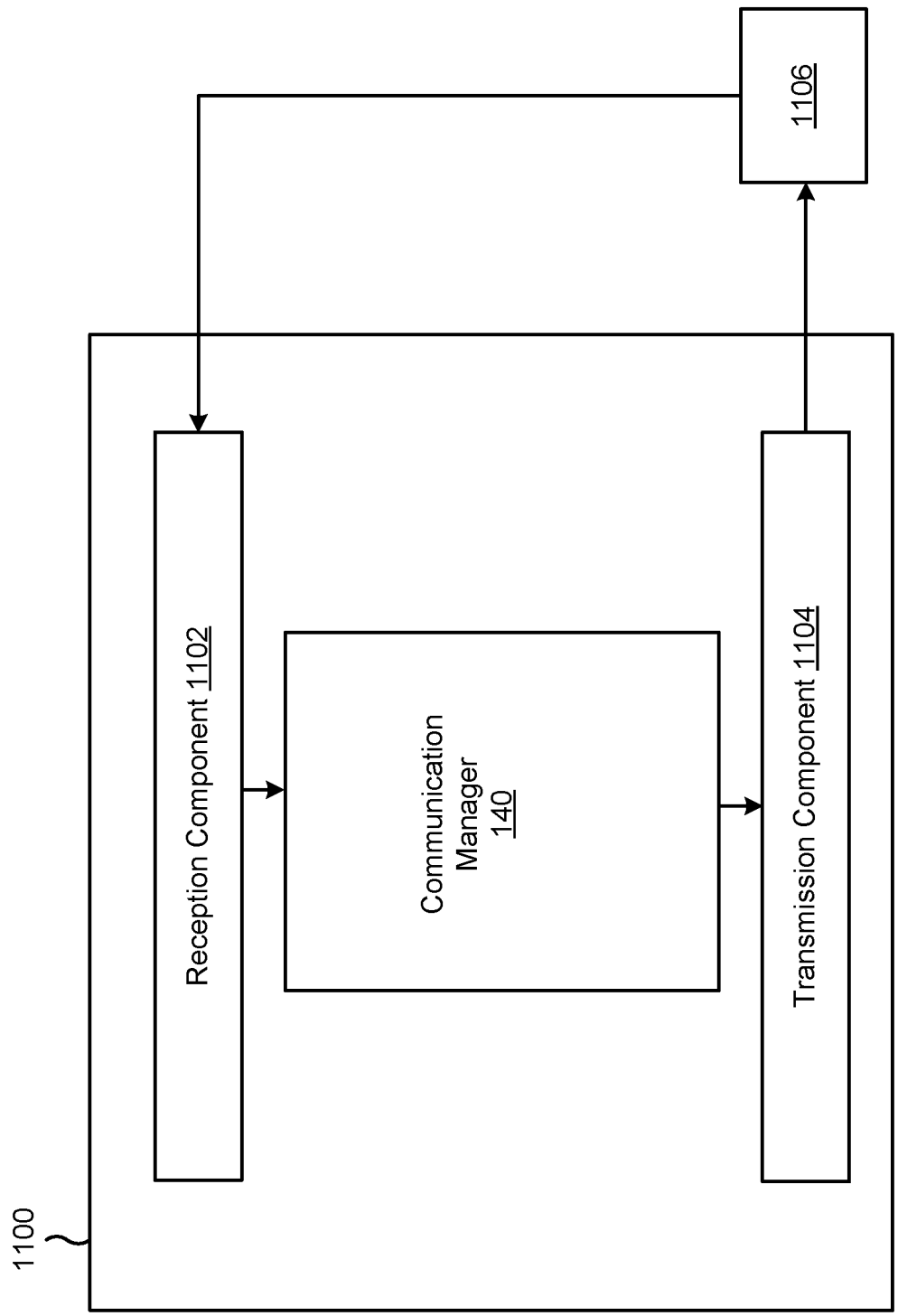
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140.

In some aspects, the apparatus 1100 may be configured to perform one or more operations described herein in connection with FIG. 4. Additionally, or alternatively, the apparatus 1100 may be configured to perform one or more processes described herein, such as process 500 of FIG. 5, process 600 of FIG. 6, process 700 of FIG. 7, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 140 and/or reception component 1102 may monitor a search space associated with a PDCCH corresponding to an MBS PDSCH for at least one MBS PDCCH communication having a payload that is scrambled according to a PDCCH payload scrambling sequence based on a value of an RNTI, wherein the value of the RNTI is equal to a G-RNTI or zero. The reception component 1102 may receive the at least one MBS PDCCH communication. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 1102 and/or the transmission component 1104.

The reception component 1102 may receive a configuration of a PDCCH DMRS scrambling ID for a control resource set associated with the search space, wherein the value of the RNTI is equal to the G-RNTI based on receiving the configuration of the PDCCH DMRS scrambling ID. The reception component 1102 may receive a configuration of a PDCCH DMRS scrambling ID for a CORESET associated with the search space.

The reception component 1102 may receive a dedicated configuration indication that configures the search space, wherein the value of the RNTI is equal to the G-RNTI based on receiving the configuration of the PDCCH DMRS scrambling ID and the dedicated configuration indication.

The reception component 1102 may receive a configuration of a PDCCH DMRS scrambling ID for a CORESET associated with the search space wherein monitoring the search space comprises monitoring the search space only in an RRC connected state, and wherein the value of the RNTI is equal to the G-RNTI based on receiving the configuration of the PDCCH DMRS scrambling ID and monitoring the search space only in the RRC connected state.

The communication manager 140 and/or reception component 1102 may monitor at least one additional search space for at least one additional MBS PDCCH that schedules at least one additional MBS PDSCH communication associated with at least one additional G-RNTI of the plurality of G-RNTIs.

The reception component 1102 may receive an RRC configuration that indicates a mapping between the search space and the G-RNTI.

The communication manager 140 and/or reception component 1102 may monitor a search space associated with a PDCCH corresponding to an MBS PDSCH for at least one MBS PDCCH communication having a CCE index corresponding to a hash function that is based on a value of an RNTI, wherein the value of the RNTI is equal to a G-RNTI or zero. The reception component 1102 may receive the at least one MBS PDCCH communication.

The reception component 1102 may receive an indication of an RRC parameter that enables the RNTI to equal the G-RNTI, wherein the value of the RNTI is equal to the G-RNTI based on receiving the indication of the RRC parameter.

The reception component 1102 may receive a dedicated configuration indication that configures the search space, wherein the value of the RNTI is equal to the G-RNTI based on receiving the dedicated configuration indication.

The communication manager 140 and/or reception component 1102 may monitor at least one additional search space for at least one additional MBS PDCCH that schedules at least one additional MBS PDSCH communication associated with at least one additional G-RNTI of the plurality of G-RNTIs.

The reception component 1102 may receive an RRC configuration that indicates a mapping between the search space and the G-RNTI.

The reception component 1102 may receive an MBS configuration that configures a plurality of G-RNTIs for a cell. The communication manager 140 and/or reception component 1102 may monitor, based on the MBS configuration, at least one search space associated with a PDCCH corresponding to an MBS PDSCH of the cell for at least one MBS PDCCH communication that schedules at least one MBS PDSCH communication of a plurality of MBS PDSCH communications.

The reception component 1102 may receive a configuration that indicates a configurable dedicated value of an RNTI, wherein the configurable dedicated value of the RNTI is associated with at least one of a PDCCH payload scrambling sequence, a hash function corresponding to a CCE index, or a CRC scrambling sequence.

The reception component 1102 may receive a radio resource control configuration that indicates a mapping between the at least one search space and at least one G-RNTI of the plurality of G-RNTIs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
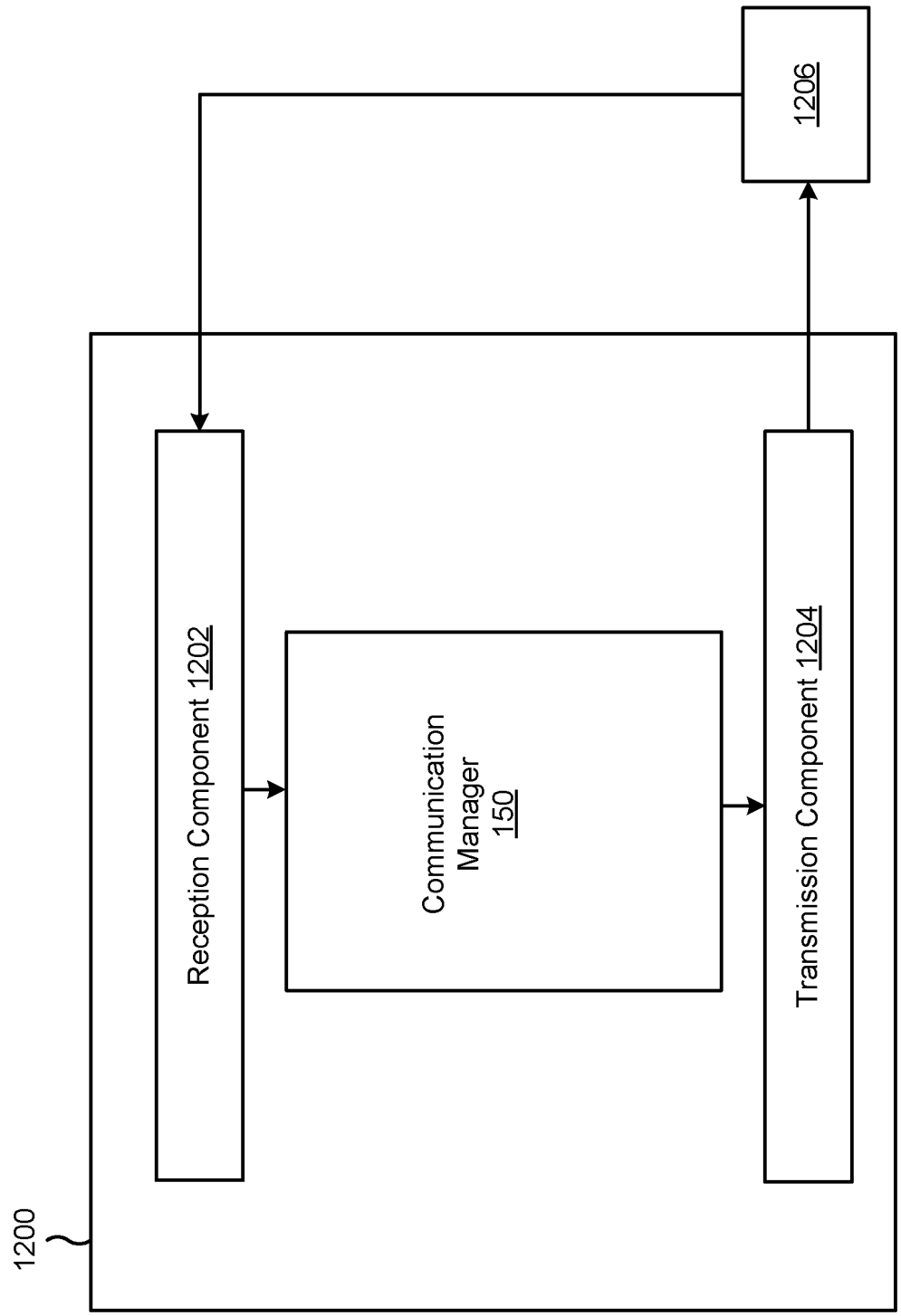

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150.

In some aspects, the apparatus 1200 may be configured to perform one or more operations described herein in connection with FIG. 4. Additionally, or alternatively, the apparatus 1200 may be configured to perform one or more processes described herein, such as process 800 of FIG. 8, process 900 of FIG. 9, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The communication manager 150 and/or transmission component 1204 may generate and transmit an MBS configuration that indicates a PDCCH payload scrambling sequence based on a value of an RNTI for a search space associated with a PDCCH corresponding to an MBS PDSCH, wherein the value of the RNTI is equal to a G-RNTI or zero. The transmission component 1204 may transmit at least one MBS PDCCH communication based at least in part on the configuration. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 1202 and/or the transmission component 1204.

The transmission component 1204 may transmit a configuration of a PDCCH DMRS scrambling ID for a control resource set associated with the search space, wherein the value of the RNTI is equal to the G-RNTI based on transmitting the configuration of the PDCCH DMRS scrambling ID.

The transmission component 1204 may transmit a configuration of a PDCCH DMRS scrambling ID for a CORE-SET associated with the search space.

The transmission component 1204 may transmit a dedicated configuration indication that configures the search space, wherein the value of the RNTI is equal to the G-RNTI based on transmitting the configuration of the PDCCH DMRS scrambling ID and the dedicated configuration indication.

The transmission component 1204 may transmit, to a UE, a configuration of a PDCCH DMRS scrambling ID for a CORESET associated with the search space.

The transmission component 1204 may transmit a monitoring configuration that indicates that the UE is to monitor the search space only in an RRC connected state wherein the value of the RNTI is equal to the G-RNTI based on transmitting the configuration of the PDCCH DMRS scrambling ID and the monitoring configuration.

The transmission component 1204 may transmit a monitoring configuration that indicates that a UE is to monitor at least one additional search space for at least one additional MBS PDCCH that schedules at least one additional MBS PDSCH communication associated with at least one additional G-RNTI of the plurality of G-RNTIs.

The transmission component 1204 may transmit a radio resource control configuration that indicates a mapping between the search space and the G-RNTI.

The transmission component 1204 may transmit an MBS configuration that indicates a PDCCH hash function based on a value of an RNTI for a search space associated with a PDCCH corresponding to an MBS PDSCH, wherein the value of the RNTI is equal to a G-RNTI or zero. The transmission component 1204 may transmit at least one MBS PDCCH communication based at least in part on the configuration.

The transmission component 1204 may transmit an indication of an RRC parameter that enables the RNTI to equal the G-RNTI, wherein the value of the RNTI is equal to the G-RNTI based on transmitting the indication of the RRC parameter.

The transmission component 1204 may transmit a dedicated configuration indication that configures the search space, wherein the value of the RNTI is equal to the G-RNTI based on transmitting the dedicated configuration indication.

The transmission component 1204 may transmit a monitoring configuration that indicates that a UE is to monitor at least one additional search space for at least one additional MBS PDCCH that schedules at least one additional MBS PDSCH communication associated with at least one additional G-RNTI of the plurality of G-RNTIs.

The transmission component 1204 may transmit a radio resource control configuration that indicates a mapping between the search space and the G-RNTI.

The transmission component 1204 may transmit an MBS configuration that configures a plurality of G-RNTIs for a cell. The transmission component 1204 may transmit, based on the MBS configuration and using at least one search space associated with a PDCCH corresponding to an MBS PDSCH of the cell, at least one MBS PDCCH communication that schedules at least one MBS PDSCH communication of a plurality of MBS PDSCH communications.

The transmission component 1204 may transmit a configuration that indicates a configurable dedicated value of an RNTI, wherein the configurable dedicated value of the RNTI is associated with at least one of a PDCCH payload scrambling sequence, a hash function corresponding to a CCE index, or a CRC scrambling sequence.

The transmission component 1204 may transmit a monitoring configuration that indicates that a UE is to monitor the at least one search space comprises monitoring one search space.

The transmission component 1204 may transmit a monitoring configuration that indicates that a UE is to monitor the at least one search space comprises monitoring a plurality of search spaces.

The transmission component 1204 may transmit a radio resource control configuration that indicates a mapping between the at least one search space and at least one G-RNTI of the plurality of G-RNTIs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: monitoring a search space associated with a physical downlink control channel (PDCCH) corresponding to a multicast/broadcast system (MBS) physical downlink shared channel (PDSCH) for at least one MBS PDCCH communication having a payload that is scrambled according to a PDCCH payload scrambling sequence based on a value of a radio network temporary identifier (RNTI), wherein the value of the RNTI is equal to a group-RNTI (G-RNTI) or zero; and receiving the at least one MBS PDCCH communication.

Aspect 2: The method of Aspect 1, wherein the value of the RNTI is equal to zero, the method further comprising receiving a configuration of a PDCCH demodulation reference signal (DMRS) scrambling identifier for a control resource set associated with the search space.

Aspect 3: The method of Aspect 1, wherein the value of the RNTI is equal to zero, and wherein the UE does not receive a configuration of a PDCCH demodulation reference signal (DMRS) scrambling identifier for a control resource set associated with the search space.

Aspect 4: The method of Aspect 1, wherein the value of the RNTI is equal to zero, and a PDCCH demodulation reference signal (DMRS) scrambling identifier is not supported for a control resource set associated with the search space.

Aspect 5: The method of Aspect 1, wherein the value of the RNTI is equal to the G-RNTI, the method further comprising receiving a configuration of a PDCCH demodulation reference signal (DMRS) scrambling identifier for a control resource set associated with the search space.

Aspect 6: The method of Aspect 1, wherein the value of the RNTI is equal to the G-RNTI, and wherein the UE does not receive a configuration of a PDCCH demodulation reference signal (DMRS) scrambling identifier for a control resource set associated with the search space.

Aspect 7: The method of Aspect 1, further comprising receiving a configuration of a PDCCH demodulation reference signal (DMRS) scrambling identifier (ID) for a control resource set associated with the search space, wherein the value of the RNTI is equal to the G-RNTI based on receiving the configuration of the PDCCH DMRS scrambling ID.

Aspect 8: The method of Aspect 1, wherein the UE does not receive a configuration of a PDCCH demodulation reference signal (DMRS) scrambling identifier (ID) for a control resource set associated with the search space, and wherein the value of the RNTI is equal to zero based on the UE not receiving the configuration of the PDCCH DMRS scrambling ID.

Aspect 9: The method of Aspect 1, further comprising: receiving a configuration of a PDCCH demodulation reference signal (DMRS) scrambling identifier (ID) for a control resource set associated with the search space; and receiving a dedicated configuration indication that configures the search space, wherein the value of the RNTI is equal to the G-RNTI based on receiving the configuration of the PDCCH DMRS scrambling ID and the dedicated configuration indication.

Aspect 10: The method of Aspect 9, wherein receiving the dedicated configuration indication comprises receiving a dedicated radio resource control message.

Aspect 11: The method of either of Aspects 9 or 10, wherein receiving the dedicated configuration indication comprises receiving a radio resource control message that indicates a dedicated parameter.

Aspect 12: The method of Aspect 1, wherein the value of the RNTI is equal to zero based on a determination that the UE has not received a configuration of a PDCCH demodulation reference signal (DMRS) scrambling identifier (ID) for a control resource set associated with the search space and a dedicated configuration indication that configures the search space.

Aspect 13: The method of Aspect 1, further comprising: receiving a configuration of a PDCCH demodulation reference signal (DMRS) scrambling identifier (ID) for a control resource set associated with the search space, wherein monitoring the search space comprises monitoring the search space only in a radio resource control (RRC) connected state, and wherein the value of the RNTI is equal to the G-RNTI based on receiving the configuration of the PDCCH DMRS scrambling ID and monitoring the search space only in the RRC connected state.

Aspect 14: The method of Aspect 1, wherein the value of the RNTI is equal to zero based on a determination that the UE has not received a configuration of a PDCCH demodulation reference signal (DMRS) scrambling identifier (ID) for a control resource set associated with the search space and a determination that the search space is not monitored only in a radio resource control connected state.

Aspect 15: The method of any of Aspects 1-14, wherein the at least one MBS PDCCH communication comprises a downlink control information (DCI) transmission that schedules an MBS physical downlink shared channel.

Aspect 16: The method of Aspect 15, wherein the value of the RNTI is equal to zero based on a determination that a DCI format of the DCI transmission is a DCI format 1_0.

Aspect 17: The method of Aspect 15, wherein the value of the RNTI is equal to the G-RNTI based on a determination that a DCI format of the DCI transmission is not a DCI format 1_0.

Aspect 18: The method of any of Aspects 1-17, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

Aspect 19: The method of Aspect 18, wherein the value of the RNTI is equal to the G-RNTI and wherein at least one additional payload is scrambled according to the PDCCH payload scrambling sequence based on at least one additional value of the RNTI, wherein the at least one additional value of the RNTI is equal to at least one additional G-RNTI of the plurality of G-RNTIs.

Aspect 20: The method of Aspect 18, wherein at least one additional payload is scrambled according to the PDCCH payload scrambling sequence based on at least one additional value of the RNTI, wherein the at least one additional value of the RNTI is equal to the value of the RNTI.

Aspect 21: The method of Aspect 20, wherein the value of the RNTI is equal to a specified G-RNTI of the plurality of G-RNTIs.

Aspect 22: The method of either of Aspects 20 or 21, wherein the plurality of G-RNTIs are configured using a G-RNTI list, and wherein the value of the RNTI is equal to a first listed G-RNTI of the G-RNTI list.

Aspect 23: The method of any of Aspects 20-22, wherein the value of the RNTI is equal to a G-RNTI mapped to a multicast service.

Aspect 24: The method of Aspect 23, wherein the multicast service comprises a specified multicast service identifier (ID) of a plurality of multicast service IDs.

Aspect 25: The method of Aspect 20, wherein the value of the RNTI comprises a configurable dedicated value.

Aspect 26: The method of any of Aspects 18-25, wherein the at least one MBS PDCCH communication comprises a plurality of MBS PDCCH communications.

Aspect 27: The method of any of Aspects 18-26, further comprising monitoring at least one additional search space for at least one additional MBS PDCCH that schedules at least one additional MBS PDSCH communication associated with at least one additional G-RNTI of the plurality of G-RNTIs.

Aspect 28: The method of any of Aspects 1-27, further comprising receiving a radio resource control configuration that indicates a mapping between the search space and the G-RNTI.

Aspect 29: A method of wireless communication performed by a user equipment (UE), comprising: monitoring a search space associated with a physical downlink control channel (PDCCH) corresponding to a multicast/broadcast system (MBS) physical downlink shared channel (PDSCH) for at least one MBS PDCCH communication having a control channel element (CCE) index corresponding to a hash function that is based on a value of a radio network temporary identifier (RNTI), wherein the value of the RNTI is equal to a group-RNTI (G-RNTI) or zero; and receiving the at least one MBS PDCCH communication.

Aspect 30: The method of Aspect 29, wherein the value of the RNTI is equal to zero.

Aspect 31: The method of Aspect 29, wherein the value of the RNTI is equal to the G-RNTI.

Aspect 32: The method of Aspect 29, further comprising receiving an indication of a radio resource control (RRC) parameter that enables the RNTI to equal the G-RNTI, wherein the value of the RNTI is equal to the G-RNTI based on receiving the indication of the RRC parameter.

Aspect 33: The method of Aspect 29, wherein the value of the RNTI is equal to zero based on a determination that the UE has not received an indication of a radio resource control parameter that enables the RNTI to equal the G-RNTI.

Aspect 34: The method of Aspect 29, further comprising receiving a dedicated configuration indication that configures the search space, wherein the value of the RNTI is equal to the G-RNTI based on receiving the dedicated configuration indication.

Aspect 35: The method of Aspect 34, wherein receiving the dedicated configuration indication comprises receiving a dedicated radio resource control message.

Aspect 36: The method of either of Aspect 34 or 35, wherein receiving the dedicated configuration indication comprises receiving a radio resource control message that indicates a dedicated parameter.

Aspect 37: The method of Aspect 29, wherein the value of the RNTI is equal to zero based on a determination that the UE has not received a dedicated configuration indication that configures the search space.

Aspect 38: The method of Aspect 29, wherein monitoring the search space comprises monitoring the search space only in a radio resource control (RRC) connected state, and wherein the value of the RNTI is equal to the G-RNTI based on monitoring the search space only in the RRC connected state.

Aspect 39: The method of Aspect 29, wherein the value of the RNTI is equal to zero based on a determination that the search space is not monitored only in a radio resource control connected state.

Aspect 40: The method of any of Aspects 29-39, wherein the at least one MBS PDCCH communication comprises a downlink control information (DCI) transmission that schedules an MBS physical downlink shared channel.

Aspect 41: The method of Aspect 40, wherein the value of the RNTI is equal to zero based on a determination that a DCI format of the DCI transmission is a DCI format 1_0.

Aspect 42: The method of Aspect 40, wherein the value of the RNTI is equal to the G-RNTI based on a determination that a DCI format of the DCI transmission is not a DCI format 1_0.

Aspect 43: The method of any of Aspects 29-42, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

Aspect 44: The method of Aspect 43, wherein the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

Aspect 45: The method of Aspect 43, wherein at least one additional hash function is based on at least one additional value of the RNTI, wherein the at least one additional value of the RNTI is equal to the value of the RNTI.

Aspect 46: The method of Aspect 45, wherein the value of the RNTI is equal to a specified G-RNTI of the plurality of G-RNTIs.

Aspect 47: The method of either of Aspects 45 or 46, wherein the plurality of G-RNTIs are configured using a G-RNTI list, and wherein the value of the RNTI is equal to a first listed G-RNTI of the G-RNTI list.

Aspect 48: The method of any of Aspects 45-47, wherein the value of the RNTI is equal to a G-RNTI mapped to a multicast service.

Aspect 49: The method of Aspect 48, wherein the multicast service comprises a specified multicast service identifier (ID) of a plurality of multicast service IDs.

Aspect 50: The method of Aspect 45, wherein the value of the RNTI comprises a configurable dedicated value.

Aspect 51: The method of any of Aspects 43-50, wherein the at least one MBS PDCCH communication comprises a plurality of MBS PDCCH communications.

Aspect 52: The method of any of Aspects 43-51, further comprising monitoring at least one additional search space for at least one additional MBS PDCCH that schedules at least one additional MBS PDSCH communication associated with at least one additional G-RNTI of the plurality of G-RNTIs.

Aspect 53: The method of any of Aspects 29-52, further comprising receiving a radio resource control configuration that indicates a mapping between the search space and the G-RNTI.

Aspect 54: A method of wireless communication performed by a user equipment (UE), comprising: receiving a multicast/broadcast system (MBS) configuration that configures a plurality of group radio network temporary identifiers (G-RNTIs) for a cell; and monitoring, based on the MBS configuration, at least one search space associated with a physical downlink control channel (PDCCH) corresponding to an MBS physical downlink shared channel (PDSCH) of the cell for at least one MBS PDCCH communication that schedules at least one MBS PDSCH communication of a plurality of MBS PDSCH communications.

Aspect 55: The method of Aspect 54, wherein each MBS PDSCH communication of the plurality of MBS PDSCH communications is associated with a respective G-RNTI of the plurality of G-RNTIs.

Aspect 56: The method of either of Aspects 54 or 55, wherein at least one G-RNTI of the plurality of G-RNTIs comprises a value of an RNTI associated with at least one of: a PDCCH payload scrambling sequence, a hash function corresponding to a control channel element index, or a cyclic redundancy check scrambling sequence.

Aspect 57: The method of Aspect 56, wherein the value of the RNTI is equal to the at least one G-RNTI and wherein at least one additional value of the RNTI is equal to at least one additional G-RNTI of the plurality of G-RNTIs.

Aspect 58: The method of Aspect 56, wherein at least one additional value of the RNTI is equal to the value of the RNTI.

Aspect 59: The method of Aspect 58, wherein the value of the RNTI is equal to a specified G-RNTI of the plurality of G-RNTIs.

Aspect 60: The method of either of Aspects 58 or 59, wherein the plurality of G-RNTIs are configured using a G-RNTI list, and wherein the value of the RNTI is equal to a first listed G-RNTI of the G-RNTI list.

Aspect 61: The method of any of Aspects 56-60, wherein the at least one of the plurality of G-RNTIs is mapped to a multicast service.

Aspect 62: The method of Aspect 61, wherein the multicast service comprises a specified multicast service identifier (ID) of a plurality of multicast service IDs.

Aspect 63: The method of any of Aspects 54-62, further comprising receiving a configuration that indicates a configurable dedicated value of an RNTI, wherein the configurable dedicated value of the RNTI is associated with at least one of: a PDCCH payload scrambling sequence, a hash function corresponding to a control channel element index, or a cyclic redundancy check scrambling sequence.

Aspect 64: The method of Aspect 54, wherein monitoring the at least one search space comprises monitoring one search space.

Aspect 65: The method of Aspect 54, wherein monitoring the at least one search space comprises monitoring a plurality of search spaces.

Aspect 66: The method of any of Aspects 54-65, further comprising receiving a radio resource control configuration that indicates a mapping between the at least one search space and at least one G-RNTI of the plurality of G-RNTIs.

Aspect 67: A method of wireless communication performed by a base station, comprising: transmitting a multicast/broadcast system (MBS) configuration that indicates a physical downlink control channel (PDCCH) payload scrambling sequence based on a value of a radio network temporary identifier (RNTI) for a search space associated with a physical downlink control channel (PDCCH) corresponding to an MBS physical downlink shared channel (PDSCH), wherein the value of the RNTI is equal to a group-RNTI (G-RNTI) or zero; and transmitting at least one MBS PDCCH communication based at least in part on the configuration.

Aspect 68: The method of Aspect 67, wherein the value of the RNTI is equal to zero, the method further comprising transmitting a configuration of a PDCCH demodulation reference signal (DMRS) scrambling identifier for a control resource set associated with the search space.

Aspect 69: The method of Aspect 67, wherein the value of the RNTI is equal to zero, and wherein the base station does not transmit a configuration of a PDCCH demodulation reference signal (DMRS) scrambling identifier for a control resource set associated with the search space.

Aspect 70: The method of Aspect 67, wherein the value of the RNTI is equal to zero, and a PDCCH demodulation reference signal (DMRS) scrambling identifier is not supported for a control resource set associated with the search space.

Aspect 71: The method of Aspect 67, wherein the value of the RNTI is equal to the G-RNTI, the method further comprising transmitting a configuration of a PDCCH demodulation reference signal (DMRS) scrambling identifier for a control resource set associated with the search space.

Aspect 72: The method of Aspect 67, wherein the value of the RNTI is equal to the G-RNTI, and wherein the base station does not transmit a configuration of a PDCCH demodulation reference signal (DMRS) scrambling identifier for a control resource set associated with the search space.

Aspect 73: The method of Aspect 67, further comprising transmitting a configuration of a PDCCH demodulation reference signal (DMRS) scrambling identifier (ID) for a control resource set associated with the search space, wherein the value of the RNTI is equal to the G-RNTI based on transmitting the configuration of the PDCCH DMRS scrambling ID.

Aspect 74: The method of Aspect 67, wherein the base station does not transmit a configuration of a PDCCH demodulation reference signal (DMRS) scrambling identifier (ID) for a control resource set associated with the search space, and wherein the value of the RNTI is equal to zero based on the base station not transmitting the configuration of the PDCCH DMRS scrambling ID.

Aspect 75: The method of Aspect 67, further comprising: transmitting a configuration of a PDCCH demodulation reference signal (DMRS) scrambling identifier (ID) for a control resource set associated with the search space; and transmitting a dedicated configuration indication that configures the search space, wherein the value of the RNTI is equal to the G-RNTI based on transmitting the configuration of the PDCCH DMRS scrambling ID and the dedicated configuration indication.

Aspect 76: The method of Aspect 75, wherein transmitting the dedicated configuration indication comprises transmitting a dedicated radio resource control message.

Aspect 77: The method of either of Aspects 75 or 76, wherein transmitting the dedicated configuration indication comprises transmitting a radio resource control message that indicates a dedicated parameter.

Aspect 78: The method of Aspect 67, wherein the value of the RNTI is equal to zero based on a determination that the base station has not transmitted a configuration of a PDCCH demodulation reference signal (DMRS) scrambling identifier (ID) for a control resource set associated with the search space and a dedicated configuration indication that configures the search space.

Aspect 79: The method of Aspect 67, further comprising: transmitting, to a user equipment (UE), a configuration of a PDCCH demodulation reference signal (DMRS) scrambling identifier (ID) for a control resource set associated with the search space; and transmitting a monitoring configuration that indicates that the UE is to monitor the search space only in a radio resource control (RRC) connected state, wherein the value of the RNTI is equal to the G-RNTI based on transmitting the configuration of the PDCCH DMRS scrambling ID and the monitoring configuration.

Aspect 80: The method of Aspect 67, wherein the value of the RNTI is equal to zero based on a determination that the base station has not transmitted a configuration of a PDCCH demodulation reference signal (DMRS) scrambling identifier (ID) for a control resource set associated with the search space and a determination that the search space is not monitored only in a radio resource control connected state.

Aspect 81: The method of any of Aspects 67-80, wherein the at least one MBS PDCCH communication comprises a downlink control information (DCI) transmission that schedules an MBS physical downlink shared channel.

Aspect 82: The method of Aspect 81, wherein the value of the RNTI is equal to zero based on a determination that a DCI format of the DCI transmission is a DCI format 1_0.

Aspect 83: The method of Aspect 81, wherein the value of the RNTI is equal to the G-RNTI based on a determination that a DCI format of the DCI transmission is not a DCI format 1_0.

Aspect 84: The method of any of Aspects 67-83, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

Aspect 85: The method of Aspect 84, wherein the value of the RNTI is equal to the G-RNTI and wherein at least one additional payload is scrambled according to the PDCCH payload scrambling sequence based on at least one additional value of the RNTI, wherein the at least one additional value of the RNTI is equal to at least one additional G-RNTI of the plurality of G-RNTIs.

Aspect 86: The method of Aspect 84, wherein at least one additional payload is scrambled according to the PDCCH payload scrambling sequence based on at least one additional value of the RNTI, wherein the at least one additional value of the RNTI is equal to the value of the RNTI.

Aspect 87: The method of Aspect 86, wherein the value of the RNTI is equal to a specified G-RNTI of the plurality of G-RNTIs.

Aspect 88: The method of either of Aspects 86 or 87, wherein the plurality of G-RNTIs are configured using a G-RNTI list, and wherein the value of the RNTI is equal to a first listed G-RNTI of the G-RNTI list.

Aspect 89: The method of any of Aspects 86-88, wherein the value of the RNTI is equal to a G-RNTI mapped to a multicast service.

Aspect 90: The method of Aspect 89, wherein the multicast service comprises a specified multicast service identifier (ID) of a plurality of multicast service IDs.

Aspect 91: The method of Aspect 86, wherein the value of the RNTI comprises a configurable dedicated value.

Aspect 92: The method of any of Aspects 84-91, wherein the at least one MBS PDCCH communication comprises a plurality of MBS PDCCH communications.

Aspect 93: The method of any of Aspects 84-92, further comprising transmitting a monitoring configuration that indicates that a user equipment (UE) is to monitor at least one additional search space for at least one additional MBS PDCCH that schedules at least one additional MBS PDSCH communication associated with at least one additional G-RNTI of the plurality of G-RNTIs.

Aspect 94: The method of any of Aspects 67-93, further comprising transmitting a radio resource control configuration that indicates a mapping between the search space and the G-RNTI.

Aspect 95: A method of wireless communication performed by a base station, comprising: transmitting a multicast/broadcast system (MBS) configuration that indicates a physical downlink control channel (PDCCH) hash function based on a value of a radio network temporary identifier (RNTI) for a search space associated with a PDCCH corresponding to an MBS physical downlink shared channel (PDSCH), wherein the value of the RNTI is equal to a group-RNTI (G-RNTI) or zero; and transmitting at least one MBS PDCCH communication based at least in part on the configuration.

Aspect 96: The method of Aspect 95, wherein the value of the RNTI is equal to zero.

Aspect 97: The method of Aspect 95, wherein the value of the RNTI is equal to the G-RNTI.

Aspect 98: The method of Aspect 95, further comprising transmitting an indication of a radio resource control (RRC) parameter that enables the RNTI to equal the G-RNTI, wherein the value of the RNTI is equal to the G-RNTI based on transmitting the indication of the RRC parameter.

Aspect 99: The method of Aspect 95, wherein the value of the RNTI is equal to zero based on a determination that the base station has not transmitted an indication of a radio resource control parameter that enables the RNTI to equal the G-RNTI.

Aspect 100: The method of Aspect 95, further comprising transmitting a dedicated configuration indication that configures the search space, wherein the value of the RNTI is equal to the G-RNTI based on transmitting the dedicated configuration indication.

Aspect 101: The method of Aspect 100, wherein transmitting the dedicated configuration indication comprises transmitting a dedicated radio resource control message.

Aspect 102: The method of either of Aspects 100 or 101, wherein transmitting the dedicated configuration indication comprises transmitting a radio resource control message that indicates a dedicated parameter.

Aspect 103: The method of Aspect 95, wherein the value of the RNTI is equal to zero based on a determination that the base station has not transmitted a dedicated configuration indication that configures the search space.

Aspect 104: The method of Aspect 95, wherein transmitting a monitoring configuration that indicates that a user equipment (UE) is to monitor the search space only in a radio resource control (RRC) connected state, and wherein the value of the RNTI is equal to the G-RNTI based on the monitoring configuration.

Aspect 105: The method of Aspect 95, wherein the value of the RNTI is equal to zero based on a determination that the search space is not monitored only in a radio resource control connected state.

Aspect 106: The method of any of Aspects 95-105, wherein the at least one MBS PDCCH communication comprises a downlink control information (DCI) transmission that schedules an MBS physical downlink shared channel.

Aspect 107: The method of Aspect 106, wherein the value of the RNTI is equal to zero based on a determination that a DCI format of the DCI transmission is a DCI format 1_0.

Aspect 108: The method of Aspect 106, wherein the value of the RNTI is equal to the G-RNTI based on a determination that a DCI format of the DCI transmission is not a DCI format 1_0.

Aspect 109: The method of any of Aspects 95-108, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

Aspect 110: The method of Aspect 109, wherein the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

Aspect 111: The method of Aspect 109, wherein at least one additional hash function is based on at least one additional value of the RNTI, wherein the at least one additional value of the RNTI is equal to the value of the RNTI.

Aspect 112: The method of Aspect 111, wherein the value of the RNTI is equal to a specified G-RNTI of the plurality of G-RNTIs.

Aspect 113: The method of either of Aspects 111 or 112, wherein the plurality of G-RNTIs are configured using a G-RNTI list, and wherein the value of the RNTI is equal to a first listed G-RNTI of the G-RNTI list.

Aspect 114: The method of any of Aspects 111-113, wherein the value of the RNTI is equal to a G-RNTI mapped to a multicast service.

Aspect 115: The method of Aspect 114, wherein the multicast service comprises a specified multicast service identifier (ID) of a plurality of multicast service IDs.

Aspect 116: The method of Aspect 111, wherein the value of the RNTI comprises a configurable dedicated value.

Aspect 117: The method of any of Aspects 109-116, wherein the at least one MBS PDCCH communication comprises a plurality of MBS PDCCH communications.

Aspect 118: The method of any of Aspects 109-117, further comprising transmitting a monitoring configuration that indicates that a user equipment (UE) is to monitor at least one additional search space for at least one additional MBS PDCCH that schedules at least one additional MBS PDSCH communication associated with at least one additional G-RNTI of the plurality of G-RNTIs.

Aspect 119: The method of any of Aspects 95-118, further comprising transmitting a radio resource control configuration that indicates a mapping between the search space and the G-RNTI.

Aspect 120: A method of wireless communication performed by a base station, comprising: transmitting a multicast/broadcast system (MBS) configuration that configures a plurality of group radio network temporary identifiers (G-RNTIs) for a cell; and transmitting, based on the MBS configuration and using at least one search space associated with a physical downlink control channel (PDCCH) corresponding to an MBS physical downlink shared channel (PDSCH) of the cell, at least one MBS PDCCH communication that schedules at least one MBS PDSCH communication of a plurality of MBS PDSCH communications.

Aspect 121: The method of Aspect 120, wherein each MBS PDSCH communication of the plurality of MBS PDSCH communications is associated with a respective G-RNTI of the plurality of G-RNTIs.

Aspect 122: The method of either of Aspects 120 or 121, wherein at least one G-RNTI of the plurality of G-RNTIs comprises a value of an RNTI associated with at least one of: a PDCCH payload scrambling sequence, a hash function corresponding to a control channel element index, or a cyclic redundancy check scrambling sequence.

Aspect 123: The method of Aspect 122, wherein the value of the RNTI is equal to the at least one G-RNTI and wherein at least one additional value of the RNTI is equal to at least one additional G-RNTI of the plurality of G-RNTIs.

Aspect 124: The method of Aspect 122, wherein at least one additional value of the RNTI is equal to the value of the RNTI.

Aspect 125: The method of Aspect 124, wherein the value of the RNTI is equal to a specified G-RNTI of the plurality of G-RNTIs.

Aspect 126: The method of either of Aspects 124 or 125, wherein the plurality of G-RNTIs are configured using a G-RNTI list, and wherein the value of the RNTI is equal to a first listed G-RNTI of the G-RNTI list.

Aspect 127: The method of any of Aspects 122-126, wherein the at least one of the plurality of G-RNTIs is mapped to a multicast service.

Aspect 128: The method of Aspect 127, wherein the multicast service comprises a specified multicast service identifier (ID) of a plurality of multicast service IDs.

Aspect 129: The method of any of Aspects 120-128, further comprising transmitting a configuration that indicates a configurable dedicated value of an RNTI, wherein the configurable dedicated value of the RNTI is associated with at least one of: a PDCCH payload scrambling sequence, a hash function corresponding to a control channel element index, or a cyclic redundancy check scrambling sequence.

Aspect 130: The method of any of Aspects 120-129, further comprising transmitting a monitoring configuration that indicates that a user equipment (UE) is to monitor the at least one search space comprises monitoring one search space.

Aspect 131: The method of any of Aspects 120-130, further comprising transmitting a monitoring configuration that indicates that a user equipment (UE) is to monitor the at least one search space comprises monitoring a plurality of search spaces.

Aspect 132: The method of any of Aspects 120-131, further comprising transmitting a radio resource control configuration that indicates a mapping between the at least one search space and at least one G-RNTI of the plurality of G-RNTIs.

Aspect 133: An apparatus for wireless communication at a device, comprising a processor; memory coupled with the processor; and instructions stored in the memory and executable by the processor to cause the apparatus to perform the method of one or more of Aspects 1-28.

Aspect 134: A device for wireless communication, comprising a memory and one or more processors coupled to the memory, the one or more processors configured to perform the method of one or more of Aspects 1-28.

Aspect 135: An apparatus for wireless communication, comprising at least one means for performing the method of one or more of Aspects 1-28.

Aspect 136: A non-transitory computer-readable medium storing code for wireless communication, the code comprising instructions executable by a processor to perform the method of one or more of Aspects 1-28.

Aspect 137: A non-transitory computer-readable medium storing a set of instructions for wireless communication, the set of instructions comprising one or more instructions that, when executed by one or more processors of a device, cause the device to perform the method of one or more of Aspects 1-28.

Aspect 138: An apparatus for wireless communication at a device, comprising a processor; memory coupled with the processor; and instructions stored in the memory and executable by the processor to cause the apparatus to perform the method of one or more of Aspects 29-53.

Aspect 139: A device for wireless communication, comprising a memory and one or more processors coupled to the memory, the one or more processors configured to perform the method of one or more of Aspects 29-53.

Aspect 140: An apparatus for wireless communication, comprising at least one means for performing the method of one or more of Aspects 29-53.

Aspect 141: A non-transitory computer-readable medium storing code for wireless communication, the code comprising instructions executable by a processor to perform the method of one or more of Aspects 29-53.

Aspect 142: A non-transitory computer-readable medium storing a set of instructions for wireless communication, the set of instructions comprising one or more instructions that, when executed by one or more processors of a device, cause the device to perform the method of one or more of Aspects 29-53.

Aspect 143: An apparatus for wireless communication at a device, comprising a processor; memory coupled with the processor; and instructions stored in the memory and executable by the processor to cause the apparatus to perform the method of one or more of Aspects 54-66.

Aspect 144: A device for wireless communication, comprising a memory and one or more processors coupled to the memory, the one or more processors configured to perform the method of one or more of Aspects 54-66.

Aspect 145: An apparatus for wireless communication, comprising at least one means for performing the method of one or more of Aspects 54-66.

Aspect 146: A non-transitory computer-readable medium storing code for wireless communication, the code comprising instructions executable by a processor to perform the method of one or more of Aspects 54-66.

Aspect 147: A non-transitory computer-readable medium storing a set of instructions for wireless communication, the set of instructions comprising one or more instructions that, when executed by one or more processors of a device, cause the device to perform the method of one or more of Aspects 54-66.

Aspect 148: An apparatus for wireless communication at a device, comprising a processor; memory coupled with the processor; and instructions stored in the memory and executable by the processor to cause the apparatus to perform the method of one or more of Aspects 67-94.

Aspect 149: A device for wireless communication, comprising a memory and one or more processors coupled to the memory, the one or more processors configured to perform the method of one or more of Aspects 67-94.

Aspect 150: An apparatus for wireless communication, comprising at least one means for performing the method of one or more of Aspects 67-94.

Aspect 151: A non-transitory computer-readable medium storing code for wireless communication, the code comprising instructions executable by a processor to perform the method of one or more of Aspects 67-94.

Aspect 152: A non-transitory computer-readable medium storing a set of instructions for wireless communication, the set of instructions comprising one or more instructions that, when executed by one or more processors of a device, cause the device to perform the method of one or more of Aspects 67-94

Aspect 153: An apparatus for wireless communication at a device, comprising a processor; memory coupled with the processor; and instructions stored in the memory and executable by the processor to cause the apparatus to perform the method of one or more of Aspects 95-119.

Aspect 154: A device for wireless communication, comprising a memory and one or more processors coupled to the memory, the one or more processors configured to perform the method of one or more of Aspects 95-119.

Aspect 155: An apparatus for wireless communication, comprising at least one means for performing the method of one or more of Aspects 95-119.

Aspect 156: A non-transitory computer-readable medium storing code for wireless communication, the code comprising instructions executable by a processor to perform the method of one or more of Aspects 95-119.

Aspect 157: A non-transitory computer-readable medium storing a set of instructions for wireless communication, the set of instructions comprising one or more instructions that, when executed by one or more processors of a device, cause the device to perform the method of one or more of Aspects 95-119.

Aspect 158: An apparatus for wireless communication at a device, comprising a processor; memory coupled with the processor; and instructions stored in the memory and executable by the processor to cause the apparatus to perform the method of one or more of Aspects 120-132.

Aspect 159: A device for wireless communication, comprising a memory and one or more processors coupled to the memory, the one or more processors configured to perform the method of one or more of Aspects 120-132.

Aspect 160: An apparatus for wireless communication, comprising at least one means for performing the method of one or more of Aspects 120-132.

Aspect 161: A non-transitory computer-readable medium storing code for wireless communication, the code comprising instructions executable by a processor to perform the method of one or more of Aspects 120-132.

Aspect 162: A non-transitory computer-readable medium storing a set of instructions for wireless communication, the set of instructions comprising one or more instructions that, when executed by one or more processors of a device, cause the device to perform the method of one or more of Aspects 120-132.

Aspect 163: A method of wireless communication performed by a user equipment (UE), comprising: monitoring a search space associated with a physical downlink control channel (PDCCH) corresponding to a multicast/broadcast system (MBS) physical downlink shared channel (PDSCH) for at least one MBS PDCCH communication having a payload that is scrambled according to a PDCCH payload scrambling sequence based on a value of a radio network temporary identifier (RNTI), wherein the value of the RNTI is equal to zero; and receiving the at least one MBS PDCCH communication.

Aspect 164: The method of Aspect 163, the method further comprising receiving a configuration of a PDCCH demodulation reference signal (DMRS) scrambling identifier for a control resource set associated with the search space.

Aspect 165: The method of Aspect 163, wherein the UE does not receive a configuration of a PDCCH demodulation reference signal (DMRS) scrambling identifier for a control resource set associated with the search space.

Aspect 166: The method of Aspect 163, a PDCCH demodulation reference signal (DMRS) scrambling identifier is not supported for a control resource set associated with the search space.

Aspect 167: The method of Aspect 163, wherein the at least one MBS PDCCH communication comprises a cyclic redundancy check (CRC) scrambled using a group RNTI (G-RNTI).

Aspect 168: The method of Aspect 167, wherein the at least one MBS PDCCH communication schedules a plurality of MBS PDSCH communications, wherein each MBS PDSCH communication of the plurality of MBS PDSCH communications is associated with a respective group RNTI (G-RNTI) of a plurality of G-RNTIs that includes the G-RNTI.

Aspect 169: The method of Aspect 168, wherein at least one additional payload is scrambled according to the PDCCH payload scrambling sequence based on at least one additional value of the G-RNTI, wherein the at least one additional value of the G-RNTI is equal to at least one additional G-RNTI of the plurality of G-RNTIs.

Aspect 170: The method of either of Aspects 168 or 169, wherein at least one additional payload is scrambled according to the PDCCH payload scrambling sequence based on at least one additional value of the G-RNTI, wherein the at least one additional value of the G-RNTI is equal to the value of the G-RNTI.

Aspect 171: The method of any of Aspects 168-170, wherein the value of the G-RNTI is equal to a specified G-RNTI of the plurality of G-RNTIs.

Aspect 172: The method of any of Aspects 168-171, wherein the plurality of G-RNTIs are configured using a G-RNTI list, and wherein the value of the G-RNTI is equal to a first listed G-RNTI of the G-RNTI list.

Aspect 173: The method of any of Aspects 168-172, wherein the value of the G-RNTI is equal to a G-RNTI mapped to a multicast service.

Aspect 174: The method of Aspect 173, wherein the multicast service comprises a specified multicast service ID of a plurality of multicast service IDs.

Aspect 175: An apparatus for wireless communication at a device, comprising a processor; memory coupled with the processor; and instructions stored in the memory and executable by the processor to cause the apparatus to perform the method of one or more of Aspects 163-174.

Aspect 176: A device for wireless communication, comprising a memory and one or more processors coupled to the memory, the one or more processors configured to perform the method of one or more of Aspects 163-174.

Aspect 177: An apparatus for wireless communication, comprising at least one means for performing the method of one or more of Aspects 163-174.

Aspect 178: A non-transitory computer-readable medium storing code for wireless communication, the code comprising instructions executable by a processor to perform the method of one or more of Aspects 163-174.

Aspect 179: A non-transitory computer-readable medium storing a set of instructions for wireless communication, the set of instructions comprising one or more instructions that, when executed by one or more processors of a device, cause the device to perform the method of one or more of Aspects 163-174.

Aspect 180: A method of wireless communication performed by a base station, comprising: transmitting a multicast/broadcast system (MBS) configuration that indicates a physical downlink control channel (PDCCH) payload scrambling sequence based on a value of a radio network temporary identifier (RNTI) for a search space associated with a physical downlink control channel (PDCCH) corresponding to an MBS physical downlink shared channel (PDSCH), wherein the value of the RNTI is equal to zero; and transmitting at least one MBS PDCCH communication based at least in part on the configuration.

Aspect 181: The method of Aspect 180, the method further comprising transmitting a configuration of a PDCCH demodulation reference signal (DMRS) scrambling identifier for a control resource set associated with the search space.

Aspect 182: The method of Aspect 180, wherein the base station does not transmit a configuration of a PDCCH demodulation reference signal (DMRS) scrambling identifier for a control resource set associated with the search space.

Aspect 183: The method of Aspect 180, a PDCCH demodulation reference signal (DMRS) scrambling identifier is not supported for a control resource set associated with the search space.

Aspect 184: The method of Aspect 180, wherein the at least one MBS PDCCH communication comprises a cyclic redundancy check (CRC) scrambled using a group RNTI (G-RNTI).

Aspect 185: The method of Aspect 184, wherein the at least one MBS PDCCH communication schedules a plurality of MBS PDSCH communications, wherein each MBS PDSCH communication of the plurality of MBS PDSCH communications is associated with a respective group RNTI (G-RNTI) of a plurality of G-RNTIs that includes the G-RNTI.

Aspect 186: The method of Aspect 185, wherein at least one additional payload is scrambled according to the PDCCH payload scrambling sequence based on at least one additional value of the G-RNTI, wherein the at least one additional value of the G-RNTI is equal to at least one additional G-RNTI of the plurality of G-RNTIs.

Aspect 187: The method of either of Aspects 185 or 186, wherein at least one additional payload is scrambled according to the PDCCH payload scrambling sequence based on at least one additional value of the G-RNTI, wherein the at least one additional value of the G-RNTI is equal to the value of the G-RNTI.

Aspect 188: The method of any of Aspects 185-187, wherein the value of the G-RNTI is equal to a specified G-RNTI of the plurality of G-RNTIs.

Aspect 189: The method of any of Aspects 185-188, wherein the plurality of G-RNTIs are configured using a G-RNTI list, and wherein the value of the G-RNTI is equal to a first listed G-RNTI of the G-RNTI list.

Aspect 190: The method of any of Aspects 185-189, wherein the value of the G-RNTI is equal to a G-RNTI mapped to a multicast service.

Aspect 191: The method of Aspect 190, wherein the multicast service comprises a specified multicast service ID of a plurality of multicast service IDs.

Aspect 192: An apparatus for wireless communication at a device, comprising a processor; memory coupled with the processor; and instructions stored in the memory and executable by the processor to cause the apparatus to perform the method of one or more of Aspects 180-191.

Aspect 193: A device for wireless communication, comprising a memory and one or more processors coupled to the memory, the one or more processors configured to perform the method of one or more of Aspects 180-191.

Aspect 194: An apparatus for wireless communication, comprising at least one means for performing the method of one or more of Aspects 180-191.

Aspect 195: A non-transitory computer-readable medium storing code for wireless communication, the code comprising instructions executable by a processor to perform the method of one or more of Aspects 180-191.

Aspect 196: A non-transitory computer-readable medium storing a set of instructions for wireless communication, the set of instructions comprising one or more instructions that, when executed by one or more processors of a device, cause the device to perform the method of one or more of Aspects 180-191.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
monitor a search space associated with a physical downlink control channel (PDCCH) corresponding to a multicast/broadcast system (MBS) physical downlink shared channel (PDSCH) for at least one MBS PDCCH communication having a control channel element (CCE) index corresponding to a hash function that is based on a value of a radio network temporary identifier (RNTI), wherein the value of the RNTI is equal to a group-RNTI (G-RNTI); and
receive the at least one MBS PDCCH communication.

2. The UE of claim 1, wherein the one or more processors are further configured to receive an indication of a radio resource control (RRC) parameter that enables the RNTI to equal the G-RNTI, wherein the value of the RNTI is equal to the G-RNTI based on receiving the indication of the RRC parameter.

3. The UE of claim 1, wherein the one or more processors are further configured to receive a dedicated configuration indication that configures the search space, wherein the value of the RNTI is equal to the G-RNTI based on receiving the dedicated configuration indication.

4. The UE of claim 1, wherein the one or more processors, to monitor the search space, are configured to monitor the search space only in a radio resource control (RRC) connected state, and wherein the value of the RNTI is equal to the G-RNTI based on monitoring the search space only in the RRC connected state.

5. The UE of claim 1, wherein the at least one MBS PDCCH communication comprises a downlink control information (DCI) transmission that schedules an MBS physical downlink shared channel.

6. The UE of claim 1, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

7. The UE of claim 6, wherein the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

8. The UE of claim 6, wherein at least one additional hash function is based on at least one additional value of the RNTI, wherein the at least one additional value of the RNTI is equal to the value of the RNTI.

9. The UE of claim 8, wherein the value of the RNTI is equal to a G-RNTI mapped to a multicast service.

10. The UE of claim 6, wherein the at least one MBS PDCCH communication comprises a plurality of MBS PDCCH communications.

11. The UE of claim 6, wherein the one or more processors are further configured to monitor at least one additional search space for at least one additional MBS PDCCH that schedules at least one additional MBS PDSCH communication associated with at least one additional G-RNTI of the plurality of G-RNTIs.

12. The UE of claim 1, wherein the one or more processors are further configured to receive a radio resource control configuration that indicates a mapping between the search space and the G-RNTI.

13. A network node for wireless communication, comprising:
a memory; and
one or more processors, coupled to the memory, configured to:
transmit a multicast/broadcast system (MBS) configuration that indicates a physical downlink control channel (PDCCH) hash function based on a value of a radio network temporary identifier (RNTI) for a search space associated with a PDCCH corresponding to an MBS physical downlink shared channel (PDSCH), wherein the value of the RNTI is equal to a group-RNTI (G-RNTI); and
transmit at least one MBS PDCCH communication based at least in part on the configuration.

14. The network node of claim 13, wherein the one or more processors are further configured to transmit an indication of a radio resource control (RRC) parameter that enables the RNTI to equal the G-RNTI, wherein the value of the RNTI is equal to the G-RNTI based on transmitting the indication of the RRC parameter.

15. The network node of claim 13, wherein the one or more processors are further configured to transmit a dedicated configuration indication that configures the search space, wherein the value of the RNTI is equal to the G-RNTI based on transmitting the dedicated configuration indication.

16. The network node of claim 13, wherein the one or more processors are further configured to transmit a monitoring configuration that indicates that a user equipment (UE) is to monitor the search space only in a radio resource control (RRC) connected state, and wherein the value of the RNTI is equal to the G-RNTI based on the monitoring configuration.

17. The network node of claim 13, wherein the at least one MBS PDCCH communication schedules a plurality of MBS physical downlink shared channel (PDSCH) communications, wherein each MBS PDSCH communication of the plurality of MBS PDSCH communications is associated with a respective G-RNTI of a plurality of G-RNTIs that includes the G-RNTI.

18. The network node of claim 17, wherein the value of the RNTI is equal to the G-RNTI and wherein at least one additional CCE index corresponds to at least one additional hash function that is based on at least one additional value of the RNTI, wherein the at least one additional value of the RNTI is equal to at least one additional G-RNTI of the plurality of G-RNTIs.

19. The network node of claim 18, wherein at least one additional hash function is based on at least one additional value of the RNTI, wherein the at least one additional value of the RNTI is equal to the value of the RNTI.

20. The network node of claim 19, wherein the value of the RNTI is equal to a specified G-RNTI of the plurality of G-RNTIs.

21. The network node of claim 19, wherein the plurality of G-RNTIs are configured using a G-RNTI list, and wherein the value of the RNTI is equal to a first listed G-RNTI of the G-RNTI list.

22. The network node of claim 19, wherein the value of the RNTI is equal to a G-RNTI mapped to a multicast service.

23. The network node of claim 22, wherein the multicast service comprises a specified multicast service identifier (ID) of a plurality of multicast service IDs.

24. The network node of claim 17, wherein the at least one MBS PDCCH communication comprises a plurality of MBS PDCCH communications.

25. A method of wireless communication performed by a user equipment (UE), comprising:
monitoring a search space associated with a physical downlink control channel (PDCCH) corresponding to a multicast/broadcast system (MBS) physical downlink shared channel (PDSCH) for at least one MBS PDCCH communication having a control channel element (CCE) index corresponding to a hash function that is based on a value of a radio network temporary identifier (RNTI), wherein the value of the RNTI is equal to a group-RNTI (G-RNTI); and
receiving the at least one MBS PDCCH communication.

26. The method of claim 25, the method further comprising receiving an indication of a radio resource control (RRC) parameter that enables the RNTI to equal the G-RNTI, wherein the value of the RNTI is equal to the G-RNTI based on receiving the indication of the RRC parameter.

27. The method of claim 25, wherein monitoring the search space comprises monitoring the search space only in a radio resource control (RRC) connected state, wherein the value of the RNTI is equal to the G-RNTI based on monitoring the search space only in the RRC connected state.

28. A method of wireless communication performed by a network node, comprising:
transmitting a multicast/broadcast system (MBS) configuration that indicates a physical downlink control channel (PDCCH) payload scrambling sequence based on a value of a radio network temporary identifier (RNTI) for a search space associated with a PDCCH corresponding to an MBS physical downlink shared channel (PDSCH), wherein the value of the RNTI is equal to a group-RNTI (G-RNTI); and
transmitting at least one MBS PDCCH communication based at least in part on the configuration.

29. The method of claim 28, the method further comprising transmitting an indication of a radio resource control (RRC) parameter that enables the RNTI to equal the G-RNTI, wherein the value of the RNTI is equal to the G-RNTI based on transmitting the indication of the RRC parameter.

30. The method of claim 28, the method further comprising transmitting a dedicated configuration indication that configures the search space, wherein the value of the RNTI is equal to the G-RNTI based on transmitting the dedicated configuration indication.

* * * * *